United States Patent
Finn et al.

(10) Patent No.: US 9,235,319 B2
(45) Date of Patent: Jan. 12, 2016

(54) GEOMETRIC AND TEXTURE MODIFICATIONS OF OBJECTS IN A VIRTUAL UNIVERSE BASED ON REAL WORLD USER CHARACTERISTICS

(71) Applicant: International Business Machines Corporation, Armonk, NY (US)

(72) Inventors: Peter G. Finn, Brampton (CA); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/917,891

(22) Filed: Jun. 14, 2013

(65) Prior Publication Data
US 2013/0283191 A1    Oct. 24, 2013

Related U.S. Application Data

(63) Continuation of application No. 12/168,657, filed on Jul. 7, 2008, now Pat. No. 8,471,843.

(51) Int. Cl.
*G06T 15/00* (2011.01)
*G06F 3/0481* (2013.01)
*A63F 13/30* (2014.01)

(52) U.S. Cl.
CPC .......... *G06F 3/04815* (2013.01); *A63F 13/12* (2013.01); *A63F 2300/5506* (2013.01); *A63F 2300/5546* (2013.01); *A63F 2300/6653* (2013.01)

(58) Field of Classification Search
None
See application file for complete search history.

(56) References Cited

U.S. PATENT DOCUMENTS

| 5,862,426 A | 1/1999 | Ichino et al. |
| 6,023,270 A | 2/2000 | Brush, II et al. |

(Continued)

FOREIGN PATENT DOCUMENTS

| JP | 09-211536 | 8/1997 |
| JP | 10-068984 | 3/1998 |

(Continued)

OTHER PUBLICATIONS

Final office action dated Sep. 27, 2013 regarding U.S. Appl. No. 11/846,724, 13 pages.

(Continued)

*Primary Examiner* — Peter Hoang
(74) *Attorney, Agent, or Firm* — Yee & Associates, P.C.; Lisa Ulrich

(57) ABSTRACT

A computer implemented method, apparatus, and computer usable program product modify objects in a virtual universe. The virtual universe includes a viewable field, a detection area that is adjacent to the viewable field, and an outside area that is outside the viewable field and the detection area. Each avatar in a set of avatars is incapable of viewing the objects while the avatar is within either the detection area or the outside area. In response to an entrance of a first particular avatar of the set of avatars into the detection area, one of the objects is prepared for display to the first particular avatar of the set of avatars, without displaying, by buffering content associated with the one of the objects. If a particular one of the objects is determined to be adjacent to an obstructing one of the objects, a focal point of the viewable field is set at a location that is a different location than a location of the particular one of the objects.

22 Claims, 12 Drawing Sheets

(56) References Cited

U.S. PATENT DOCUMENTS

| | | | |
|---|---|---|---|
| 6,036,601 A | 3/2000 | Heckel |
| 6,349,301 B1 | 2/2002 | Mitchell et al. |
| 6,421,047 B1 | 7/2002 | de Groot |
| 6,454,652 B2 | 9/2002 | Miyamoto et al. |
| 6,532,007 B1 | 3/2003 | Matsuda |
| 6,570,563 B1 | 5/2003 | Honda |
| 6,580,811 B2 | 6/2003 | Maurer et al. |
| 6,749,510 B2 | 6/2004 | Giobbi |
| 6,788,946 B2 | 9/2004 | Winchell et al. |
| 6,798,407 B1 | 9/2004 | Benman |
| 6,868,389 B1 | 3/2005 | Wilkins et al. |
| 6,895,406 B2 | 5/2005 | Fables et al. |
| 6,954,728 B1 | 10/2005 | Kusumoto et al. |
| 6,981,220 B2 | 12/2005 | Matsuda |
| 7,025,675 B2 | 4/2006 | Fogel et al. |
| 7,158,135 B2 | 1/2007 | Santodomingo et al. |
| 7,305,691 B2 | 12/2007 | Cristofalo |
| 7,320,031 B2 | 1/2008 | Konig et al. |
| 7,454,065 B2 | 11/2008 | Satoh |
| 7,479,967 B2 | 1/2009 | Bachelder et al. |
| 7,542,040 B2 | 6/2009 | Templeman |
| 7,685,204 B2 | 3/2010 | Rogers |
| 7,720,835 B2 | 5/2010 | Ward et al. |
| 7,805,680 B2 | 9/2010 | Meyers et al. |
| 7,822,687 B2 | 10/2010 | Brillon et al. |
| 8,001,161 B2 | 8/2011 | Finn et al. |
| 8,147,149 B2 | 4/2012 | Hirabayashi et al. |
| 8,184,116 B2 | 5/2012 | Finn et al. |
| 8,203,503 B2 | 6/2012 | Castellar et al. |
| 8,212,809 B2 | 7/2012 | Finn et al. |
| 8,233,005 B2 | 7/2012 | Finn et al. |
| 8,259,100 B2 | 9/2012 | Finn et al. |
| 8,458,603 B2 | 6/2013 | Finn et al. |
| 8,466,931 B2 | 6/2013 | Finn et al. |
| 8,471,843 B2 | 6/2013 | Finn et al. |
| 2001/0033675 A1 | 10/2001 | Maurer et al. |
| 2001/0046896 A1 | 11/2001 | Miyamoto et al. |
| 2002/0024532 A1 | 2/2002 | Fables et al. |
| 2002/0056091 A1 | 5/2002 | Bala et al. |
| 2002/0107072 A1 | 8/2002 | Giobbi |
| 2002/0113809 A1 | 8/2002 | Akazawa et al. |
| 2002/0138607 A1 | 9/2002 | O'Rourke et al. |
| 2002/0169644 A1 | 11/2002 | Greene |
| 2003/0004774 A1 | 1/2003 | Greene et al. |
| 2003/0084094 A1 | 5/2003 | Shim et al. |
| 2003/0091229 A1 | 5/2003 | Edge et al. |
| 2003/0120584 A1 | 6/2003 | Zarefoss et al. |
| 2004/0030741 A1 | 2/2004 | Wolton et al. |
| 2004/0034561 A1 | 2/2004 | Smith |
| 2004/0053690 A1 | 3/2004 | Fogel et al. |
| 2004/0165880 A1 | 8/2004 | Ichino |
| 2004/0166935 A1 | 8/2004 | Gavin et al. |
| 2004/0210634 A1 | 10/2004 | Ferrer et al. |
| 2004/0220850 A1 | 11/2004 | Ferrer et al. |
| 2005/0071306 A1 | 3/2005 | Kruszewski et al. |
| 2005/0086112 A1 | 4/2005 | Shkedi |
| 2005/0086605 A1 | 4/2005 | Ferrer et al. |
| 2005/0114198 A1 | 5/2005 | Koningstein et al. |
| 2005/0125229 A1 | 6/2005 | Kurzweil |
| 2005/0151728 A1 | 7/2005 | Nenonen |
| 2005/0156928 A1 | 7/2005 | Santodomingo et al. |
| 2005/0179685 A1 | 8/2005 | Kake et al. |
| 2005/0253872 A1 | 11/2005 | Goss et al. |
| 2005/0264566 A1 | 12/2005 | Sommers |
| 2005/0264567 A1 | 12/2005 | Sommers |
| 2005/0286769 A1 | 12/2005 | Satoh |
| 2006/0098975 A1 | 5/2006 | Kobayashi |
| 2006/0130095 A1 | 6/2006 | Willis et al. |
| 2006/0168143 A1 | 7/2006 | Moetteli |
| 2006/0194632 A1 | 8/2006 | Hendrickson et al. |
| 2006/0195462 A1 | 8/2006 | Rogers |
| 2006/0258462 A1 | 11/2006 | Cheng et al. |
| 2007/0003915 A1 | 1/2007 | Templeman |
| 2007/0035561 A1 | 2/2007 | Bachelder et al. |
| 2007/0043616 A1 | 2/2007 | Kutaragi et al. |
| 2007/0100650 A1 | 5/2007 | Ramer et al. |
| 2007/0191104 A1 | 8/2007 | Van Luchene |
| 2007/0236516 A1 | 10/2007 | Castellar et al. |
| 2007/0247979 A1 | 10/2007 | Brillon et al. |
| 2007/0252841 A1 | 11/2007 | Kim |
| 2007/0261109 A1 | 11/2007 | Renaud et al. |
| 2008/0004119 A1 | 1/2008 | Van Luchene et al. |
| 2008/0007563 A1 | 1/2008 | Aronson et al. |
| 2008/0025719 A1 | 1/2008 | Uehara |
| 2008/0252716 A1 | 10/2008 | Kano et al. |
| 2008/0281622 A1 | 11/2008 | Hoal |
| 2009/0063168 A1 | 3/2009 | Finn et al. |
| 2009/0089157 A1 | 4/2009 | Narayanan |
| 2009/0227368 A1 | 9/2009 | Wyatt |
| 2009/0254417 A1 | 10/2009 | Beilby et al. |
| 2009/0267937 A1 | 10/2009 | Finn et al. |
| 2009/0267948 A1 | 10/2009 | Finn et al. |
| 2009/0267950 A1 | 10/2009 | Finn et al. |
| 2009/0267960 A1 | 10/2009 | Finn et al. |
| 2009/0271422 A1 | 10/2009 | Finn et al. |
| 2009/0299960 A1 | 12/2009 | Lineberger |
| 2009/0327219 A1 | 12/2009 | Finn et al. |
| 2010/0001993 A1 | 1/2010 | Finn et al. |
| 2010/0005423 A1 | 1/2010 | Finn et al. |
| 2010/0177117 A1 | 7/2010 | Finn et al. |
| 2010/0205179 A1 | 8/2010 | Carson et al. |
| 2010/0322616 A1 | 12/2010 | Hirabayashi et al. |
| 2012/0266088 A1 | 10/2012 | Finn et al. |

FOREIGN PATENT DOCUMENTS

| | | |
|---|---|---|
| JP | 10-319475 | 12/1998 |
| JP | 2004258120 | 9/2004 |
| JP | 2005070594 | 3/2005 |
| JP | 2005308810 | 11/2005 |
| JP | 2006018144 | 1/2006 |
| JP | 2008033152 | 2/2008 |

OTHER PUBLICATIONS

Non-final office action dated Nov. 6, 2013 regarding U.S. Appl. No. 12/165,922, 33 pages.

Notice of allowance dated Nov. 7, 2014, regarding U.S. Appl. No. 12/165,922, 8 pages.

"Avatar-Based Marketing: The Avatar-Based Panel (Part One of Five)," New World Notes, Jun. 26, 2006, 15 pages. Retrieved Nov. 10, 2011 from http://nwn.blogs.com/nwn/2006/06/avatarbased_mar.htm.

"Avatar-Based Marketing: The Avatar-Based Panel (Part Two of Five)," New World Notes, Jun. 27, 2006, 6 pages. Retrieved Nov. 10, 2011 from http://nwn.blogs.com/nwn/2006/06/avatarbased_mar.html.

"Avatar-Based Marketing: The Avatar-Based Panel (Part Three of Five)," New World Notes, Jun. 28, 2006, 6 pages. Retrieved Nov. 10, 2011 from http://nwn.blogs.com/nwn/2006/06/avatarbased_mar.html.

"Avatar-Based Marketing: The Avatar-Based Panel (Part Four of Five)," New World Notes, Jun. 29, 2006, 6 pages. Retrieved Nov. 10, 2011 from http://nwn.blogs.com/nwn/2006/06/avatarbased_mar.html.

"Avatar-Based Marketing: The Avatar-Based Panel (Part Five of Five)," New World Notes, Jun. 30, 2006, 6 pages. Retrieved Nov. 10, 2011 from http://nwn.blogs.com/nwn/2006/06/avatarbased_mar.html.

"Life2Life—ECS-Powered Amazon Store Within Second Life," Amazon Web Services Blog, Jul. 26, 2006, 7 pages. Retrieved Nov. 10, 2011 from http://aws.typepad.com/aws/2006/07/lifetolife_ecspo.html.

Reynolds, "Virtual Worlds introduction presentation," Eightbar, Aug. 17, 2006, 8 pages. Retrieved Nov. 10, 2011 from http://eightbar.co.uk/2006/08/17/virtual-worlds-introduction-presentation.

Riddikulus, "Dungeons and Dragons Online Eberron Unlimited Forums: Repeating quests-limit?" Oct. 8, 2007, 6 pages. Retrieved Dec. 16, 2011 from http://forums.ddo.com/showthread.php?t=123676.

(56) References Cited

OTHER PUBLICATIONS

Office Action, dated Oct. 27, 2010, regarding U.S. Appl. No. 11/846,724, 14 pages.
Final Office Action, dated Feb. 4, 2011, regarding U.S. Appl. No. 11/846,724, 9 pages.
Office Action, dated Dec. 20, 2012, regarding U.S. Appl. No. 11/846,724, 12 pages.
Office Action, dated Sep. 9, 2011, regarding U.S. Appl. No. 12/108,925, 24 pages.
Notice of Allowance, dated Dec. 29, 2011, regarding U.S. Appl. No. 12/108,925, 18 pages.
Office Action, dated Oct. 28, 2011, regarding U.S. Appl. No. 12/108,968, 37 pages.
Notice of Allowance, dated Feb. 21, 2012, regarding U.S. Appl. No. 12/108,968, 21 pages.
Office Action, dated Dec. 1, 2011, regarding U.S. Appl. No. 12/108,987, 39 pages.
Notice of Allowance, dated Mar. 16, 2012, regarding U.S. Appl. No. 12/108,987, 12 pages.
Office Action, dated Jan. 30, 2012, regarding U.S. Appl. No. 12/109,010, 43 pages.
Notice of Allowance, dated Apr. 11, 2012, regarding U.S. Appl. No. 12/109,010, 15 pages.
Office Action, dated Nov. 10, 2011, regarding U.S. Appl. No. 12/165,922, 49 pages.
Final Office Action, dated Jun. 21, 2012, regarding U.S. Appl. No. 12/165,922, 30 pages.
Office Action, dated Dec. 1, 2010, regarding U.S. Appl. No. 12/109,023, 20 pages.
Notice of Allowance, dated Apr. 13, 2011, regarding U.S. Appl. No. 12/109,023, 12 pages.
Supplemental Notice of Allowance, dated May 13, 2011, regarding U.S. Appl. No. 12/109,023, 4 pages.
Office Action, dated Feb. 3, 2011, regarding U.S. Appl. No. 12/109,040, 28 pages.
Final Office Action, dated Jul. 15, 2011, regarding U.S. Appl. No. 12/109,040, 23 pages.
Notice of Allowance, dated Feb. 14, 2013, regarding U.S. Appl. No. 12/109,040, 38 pages.
Office Action, dated Apr. 26, 2011, regarding U.S. Appl. No. 12/168,657, 30 pages.
Final Office Action, dated Oct. 4, 2011, regarding U.S. Appl. No. 12/168,657, 25 pages.
Office Action, dated Jun. 22, 2012, regarding U.S. Appl. No. 12/168,657, 45 pages.
Notice of Allowance, dated Dec. 13, 2012, regarding U.S. Appl. No. 12/168,657, 12 pages.
Notice of Allowance, dated Feb. 22, 2013, regarding U.S. Appl. No. 12/168,657, 13 pages.
Office Action, dated Aug. 24, 2011, regarding U.S. Appl. No. 12/353,656, 38 pages.
Final Office Action, dated Dec. 23, 2011, regarding U.S. Appl. No. 12/353,656, 47 pages.
"Trap," NWN Wikia, Nov. 12, 2007, 3 pages. Retrieved Sep. 14, 2011 from http://web archive.org/web/20071112084836/http://nwn.wikia.com/wiki/Trap.
Office Action, dated Oct. 4, 2012, regarding U.S. Appl. No. 13/531,265, 46 pages.
Notice of Allowance, dated Feb. 4, 2013, regarding U.S. Appl. No. 13/531,265, 12 pages.
"Unseen," WOW Wiki, Feb. 7, 2007, 2 pages. Retrieved Sep. 15, 2011 from http://web.archive.org/web/20070207113119/http://www.wowwiki.com/Unseen.
Gladestrider, "ZAM Everquest Classes: The Ranger—Tracking-Help," Oct. 26, 2004, 2 pages. Retrieved Dec. 16, 2011 from http://everquest.allakhazam.com/db/classes.html?=10&mid=1098807428716491276.
Hughes, "Ben Folds in Second Life the Event," Eightbar, Oct. 20, 2006, 3 pages. Retrieved Nov. 10, 2011 from http://eightbar.co.uk/2006/10/20/ben-folds-in-second-life-the-event.
Hughes, "Planes, trains and automobiles, here come Nissan," Eightbar, Oct. 24, 2006, 3 pages. Retrieved Nov. 10, 2011 from http://eightbar.co.uk/2006/10/24/planes-trains-and-automobiles-here-come-nissan.
Hughes, "The Sony BMG media island, it is very good," Eightbar, Oct. 19, 2006, 8 pages. Retrieved Nov. 10, 2011 from http://eightbar.co.uk/2006/10/19/the-sony-bmg-media-island-it-is-very-good.
Hughes, "Those custom Reeboks and the next party," Eightbar, Oct. 11, 2006, 5 pages. Retrieved Nov. 10, 2011 from http://eightbar.co.uk/2006/10/11/those-custom-reeboks-and-the-next-party.
Kiss et al., "Viewpoint Adaptation during Navigation Based on Stimuli from the Virtual Environment," Proceedings of the 8th International Conference on 3D Web Technology (Web3D '03, Mar. 2003, pp. 19-26.
Final Office Action, dated Jun. 13, 2014, regarding U.S. Appl. No. 12/165,922, 19 pages.
Notice of allowance dated Jan. 20, 2012, regarding U.S. Appl. No. 12/866,266, 5 pages.
Office action dated Sep. 29, 2011, regarding U.S. Appl. No. 12/866,266, 9 pages.
Office Action, dated Aug. 6, 2014, regarding U.S. Appl. No. 11/846,724, 16 pages.
International Search Report dated Mar. 4, 2009, regarding PCT application No. PCT/JP2009/000512, 4 pages.
Final Office Action, dated Feb. 27, 2015, regarding U.S. Appl. No. 11/846,724, 16 pages.
Hemp, "Avatar-Based Marketing," Harvard Business Review, Jun. 2006, 17 pages. https://hbr.org/2006/06/avatar-based-marketing.

OBJECT BASED
AVATAR TABLE
800

| RENDERING UUID — PRIMARY KEY ||
|---|---|
| 802 OBJECT A UUID | AVATAR A UUID — 804 |
| | AVATAR A ZONE 1 ENTER TIME — 806 |
| | AVATAR A ZONE 2 ENTER TIME — 808 |
| | AVATAR A ZONE 1 LEAVE TIME — 810 |
| | AVATAR A ZONE 2 LEAVE TIME — 812 |
| 820 OBJECT B UUID | AVATAR A UUID — 822 |
| | AVATAR A ZONE 1 ENTER TIME — 824 |
| | AVATAR A ZONE 2 ENTER TIME — 826 |
| | AVATAR A ZONE 1 LEAVE TIME — 828 |
| | AVATAR A ZONE 2 LEAVE TIME — 830 |
| | AVATAR C UUID — 832 |
| | AVATAR C ZONE 1 ENTER TIME — 834 |
| | AVATAR C ZONE 2 ENTER TIME — 836 |
| | AVATAR C ZONE 1 LEAVE TIME — 838 |
| | AVATAR C ZONE 2 LEAVE TIME — 840 |

FIG. 8

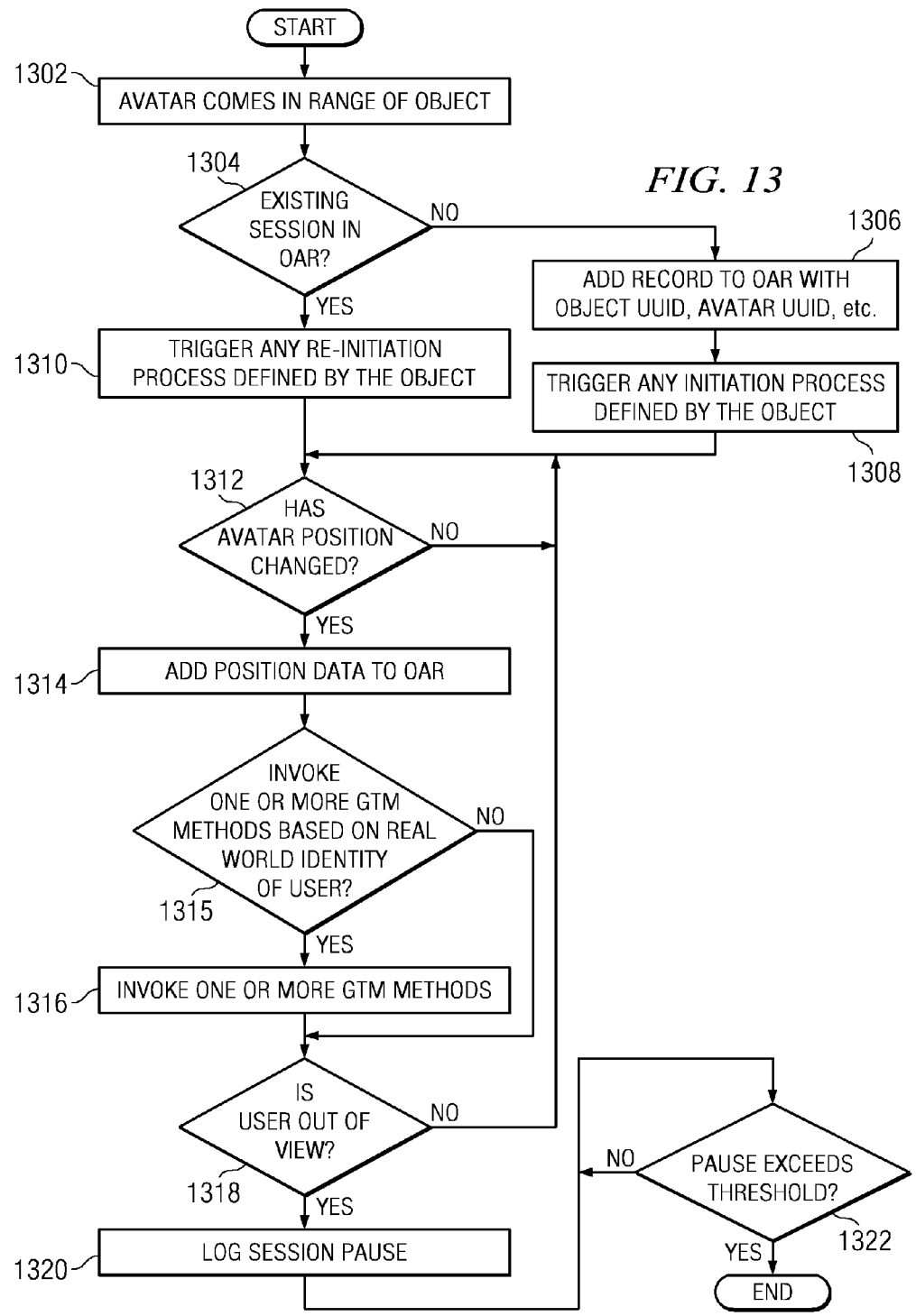

GEOMETRIC AND TEXTURE MODIFICATIONS OF OBJECTS IN A VIRTUAL UNIVERSE BASED ON REAL WORLD USER CHARACTERISTICS

This application is a continuation of application Ser. No. 12/168,657, filed Jul. 7, 2008, status allowed.

BACKGROUND OF THE INVENTION

1. Field of the Invention

The present invention is related generally to an improved data processing system, and in particular, to a method and apparatus for managing a virtual universe. More particularly, the present invention is directed to a computer implemented method, apparatus, and computer usable program code for implementing geometric and texture modifications of objects in a virtual universe based on characteristics of real world users to enhance the impact of advertising within the virtual universe.

2. Description of the Related Art

A virtual universe (VU), also referred to as a metaverse or "3D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, ores, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. The viewable field of a particular user is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. Sometimes one or more objects in a particular user's viewable field may be obstructed from view by other objects in the virtual environment such that the user is unable to see the one or more obstructed objects. For example, a sign may be hidden from view behind a statue or other larger sign. In addition, objects may prove difficult for some users to view based on their relative position and other characteristics, such as lighting and color.

BRIEF SUMMARY OF THE INVENTION

According to one embodiment of the present invention, a computer implemented method, apparatus, and computer usable program product is provided for modifying objects in a virtual universe. The virtual universe includes a viewable field, a detection area that is adjacent to the viewable field, and an outside area that is outside the viewable field and the detection area. Each avatar in a set of avatars is incapable of viewing the objects while the avatar is within either the detection area or the outside area. In response to an entrance of a first particular avatar of the set of avatars into the detection area, one of the objects is prepared for display to the first particular avatar of the set of avatars, without displaying, by buffering content associated with the one of the objects. If a particular one of the objects is determined to be adjacent to an obstructing one of the objects, a focal point of the viewable field is set at a location that is a different location than a location of the particular one of the objects.

BRIEF DESCRIPTION OF THE SEVERAL VIEWS OF THE DRAWINGS

FIG. 8 is a block diagram of an object based avatar table for a plurality of objects in accordance with an illustrative embodiment;

FIG. 13 is a flowchart illustrating a process for object based avatar tracking using object avatar rendering tables in accordance with an illustrative embodiment;

DETAILED DESCRIPTION OF THE INVENTION

Figure 1:
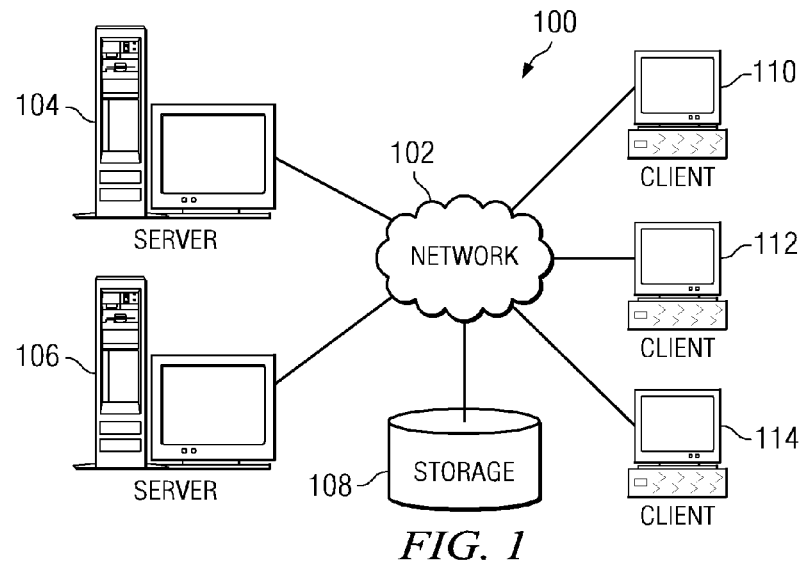
FIG. 1 is a block diagram of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
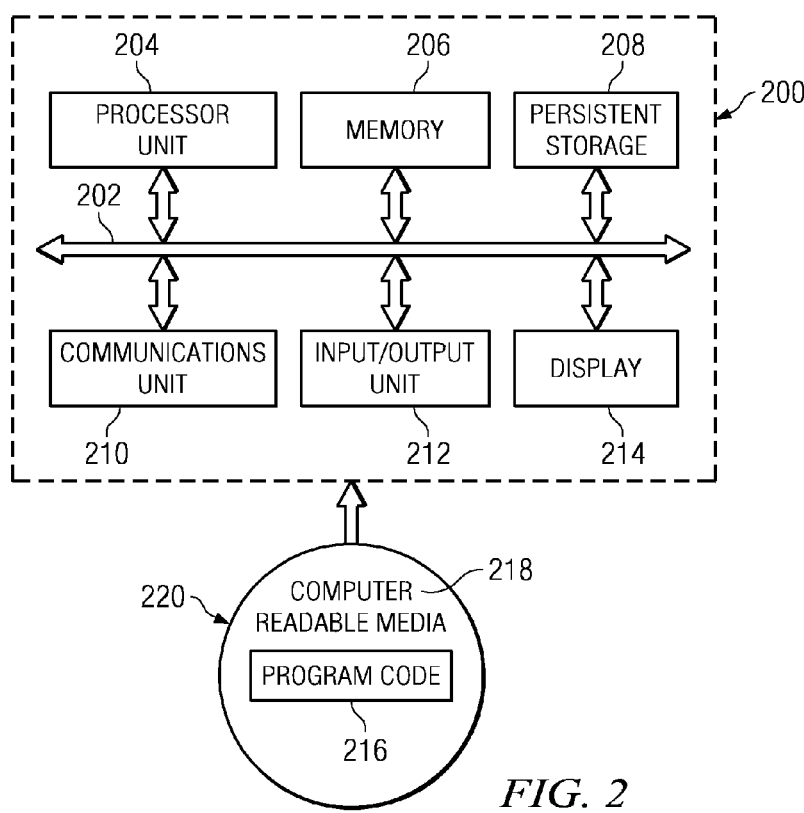
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. Users of the virtual universe have agents on servers 104 and 106. An agent is a user's account. A user uses an agent to build an avatar representing the user. The agent is tied to the inventory of assets or possessions the user owns in the virtual universe. In addition, a region in a virtual universe typically resides on a single server, such as, without limitation, server 104. A region is a virtual area of land within the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In a virtual universe, assets, avatars, the environment, and anything visual consists of unique identifiers (UUIDs) tied to geometric data, textures, and effects data. Geometric data is distributed to a user's client computer as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client. However, current virtual universe systems do not enable tracking of objects and avatars within a range of one or more selected objects. Moreover, the illustrative embodiments recognize that objects are typically rendered in a virtual universe in a static or predetermined manner regardless of the real world identity of the users controlling the avatars within range of the objects being rendered.

Therefore, one illustrative embodiment provides a computer implemented method, apparatus, and computer usable program product for modifying objects in a virtual universe. A user priority controller determines a real world identity of a set of users controlling a set of avatars in response to detecting a presence of the set of avatars within a viewable field of an object in a virtual universe. The user priority controller receives user information describing characteristics of the set of users from a set of user information sources based on the real world identity of each user in the set of users. The user priority controller generates a temporary and dynamic rule to control modification of the object based on the user information. The user priority controller modifies the object in accordance with the temporary and dynamic rule to increase visibility of the object to an avatar in the set of avatars. The temporary and dynamic rule initiates implementation of a set of geometric and texture modifications for dynamically modifying the object in accordance with the temporary and dynamic rule.

Figure 3:
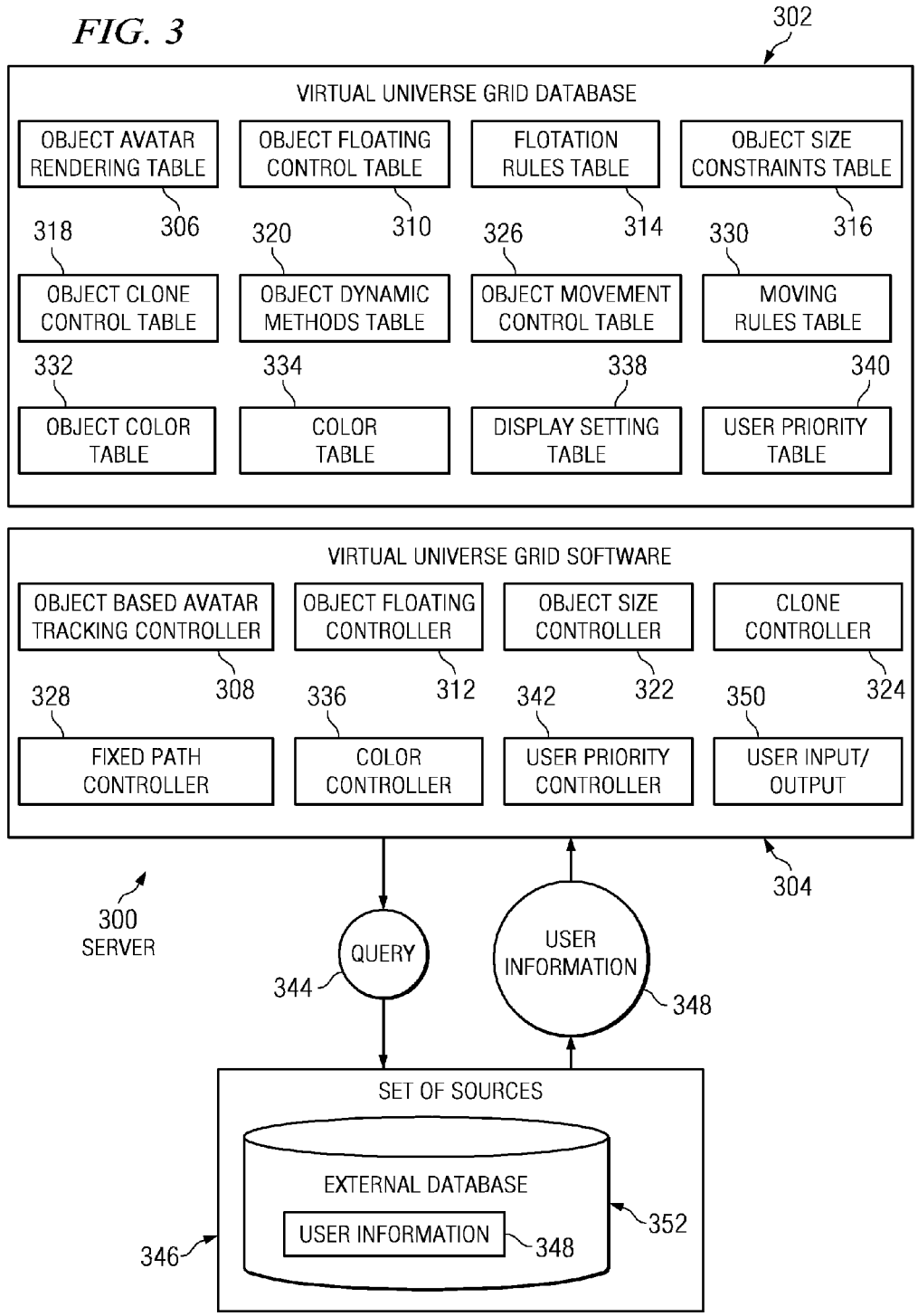
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. In this example, server 300 is a server in a virtual universe grid computing system or in a cluster of two or more servers for rendering and managing a virtual universe. In another embodiment, server 300 may be a single, stand-alone server. Virtual universe grid database 302 is a database on the grid computing system for storing data used by virtual universe grid software 304 to render and manage the virtual universe. Virtual universe grid software 304 is software for rendering the virtual universe.

In a virtual universe, assets, avatars, the environment, and anything visual in the virtual universe consists of universally unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Object avatar rendering table 306 stores a universally unique identifier (UUID) for each selected object in the virtual universe. A selected object is an object in a plurality of objects in the virtual universe that is tracked, monitored, managed, or associated with object avatar rendering table 306. Object avatar rendering table 306 also stores unique identifiers and other data describing avatars within a viewable field of a selected object or within a selected zone or range associated with the selected object. For example, if the selected objects include object A and object B, then object avatar rendering table 306 stores object A unique identifier, unique identifiers and other data for all avatars within the viewable field of object A, object B unique identifier, and unique identifiers and other data describing all avatars within the viewable field of object B.

Object avatar rendering table 306 stores a unique identifier (UUID) for each selected object in the virtual universe. A selected object is an object in a plurality of objects in the virtual universe that is tracked, monitored, managed, or associated with object avatar rendering table 306. Object avatar rendering table 306 also stores unique identifiers and other data describing avatars within a viewable field of a selected object or within a selected zone or range associated with the selected object. For example, if the selected objects include object A and object B, then object avatar rendering table 306 stores object A unique identifier, unique identifiers and other data for all avatars within the viewable field of object A, object B unique identifier, and unique identifiers and other data describing all avatars within the viewable field of object B.

Object based avatar tracking controller 308 stores data, such as, without limitation, the unique identifiers of one or more selected objects and the unique identifiers and other data describing avatars within the viewable field of the one or more selected objects. When object based avatar tracking controller 308 needs data from object avatar rendering table 306 for implementing geometric and texture modifications in the virtual universe, object based avatar tracking controller 308 sends a query to object avatar rendering table 306. In response to the query, virtual universe grid database 302 sends the requested data to virtual universe grid software 304 for utilization by object based avatar tracking controller 308. Object based avatar tracking controller 308 uses the data to track avatars and implement modifications of the selected objects to improve the position and appearance of the selected objects within the virtual universe and enable improved visibility of the selected objects based on the real-world identities of the users controlling the avatars within the viewable field of the selected objects.

Object floating control table 310 is a table storing object unique identifiers (UUIDs) and flotation rules. Flotation rules govern modifications to an object, such as, without limitation, how high an object floats above a surface, where an object floats, changes in location of a floating object, and/or changes in orientation of the floating object. A flotation rule specifies an action, motion, or change in the selected object. Flotation rules may include set coordinates within which an object floats, coordinates at which an object does not float, a minimum and/or a maximum distance the selected object can float away from a given avatar, a minimum and/or maximum distance the selected object can float from a given fixed location, a minimum and/or maximum height above a surface, and/or a minimum distance that must be maintained away from another object, such as a competitor's building or advertisement. In other words, the flotation rules may specify where an object can float and where an object cannot float. For example, and without limitation, the object may be permitted to float within certain coordinates, but not directly on top of an avatar and not higher than thirty feet above the ground in the virtual universe.

Flotation rules for floating transitions optionally include continual fluctuations, such as, without limitation, a vertical bobbing up and down motion to draw attention of users to the floating object and to enhance the effect of the floating nature of the object. Another flotation rule may specify that the selected object will move horizontally side to side as the object floats at a predetermined or variable distance above a surface. The horizontal motion may be continuous or sporadic. A sporadic motion refers to a motion that periodically slows or stops for a moment before resuming motion. For example, an object may float with a bobbing motion up and down from a first location to a second location, but periodically pause when at an apex at the second location, and then resume the continuous up and down motion without pausing when the object reaches the apex at the second location. This creates a sporadic or interrupted motion rather than a smooth, uninterrupted pattern of up and down motion.

A particular flotation rule is implemented to control the motion or changes made to a selected object based on trigger conditions. A trigger condition triggers one or more modifications to the selected object, such as triggering a flotation rule that causes the selected object to float above a fixed position. Another flotation rule may cause the selected object to turn or rotate about an axis as the object floats above a surface.

A trigger for a flotation rule may be any type of event or condition, such as, without limitation, an avatar unique identifier, a location of an avatar, a proximity of an avatar to one or more other avatars, a time of day, a location of the object, and/or any other conditions. In an embodiment where the trigger is an avatar, the input data used to determine whether the trigger condition has occurred includes the angle and pitch of the avatar's head and/or eyes. The angle and pitch are used to determine the optimal location and orientation of the selected object relative to the angle and pitch of the avatar's head and/or eyes. For example, if five avatars are in a huddle, the angle and pitch of their heads and/or eyes causes the object to float between the huddle, along the ground, and/or oriented up. The flotation rules take into account limitations of physics when implementing floating transitions, such as, without limitation, space constraints.

Object floating controller 312 is software for implementing floating transitions to modify objects in a non-fixed floating manner such that the object can have greater freedom of movement to ensure greater time seen by users and improved quality of viewing by users. Object floating controller 312 modifies a position and orientation of an object based on an occurrence of a trigger.

If two or more flotation rules are triggered and the rules conflict with each other, object floating controller 312 determines which flotation rule to implement with respect to the selected object. Object floating control table 310 optionally stores a priority for each flotation rule. The priority indicates which flotation rule takes priority when conditions are met for initiating more than one flotation rule. In another embodiment, object floating control table 310 comprises a field that designates the hierarchy, such as, without limitation, by a numeric system or other designation indicating which rule has priority. For example, a rule with a higher number is given priority over a rule with a lower number. When multiple rule matches occur, such that two or more flotation rules have been triggered, object floating controller 312 determines which flotation rule has priority based on the priority indication and/or the flotation rules position in the hierarchy of flotation rules.

Flotation rules table 314 is a table storing templates for flotation rules and actions for flotation rules. In this embodiment, flotation rules table 314 is a separate table than object floating control table 310. However, in another embodiment, flotation rules table 314 is included within object floating control table 310 rather than being implemented as a separate table.

Object size constraints table 316 is a table that includes set of object size constraints. The set of object size constraints is one or more limitations that govern the size of an object in the virtual universe. For example, an object in a virtual universe may be a billboard displaying elements such as a logo and text. The set of object size constraints in object size constraints table 308 may limit the size of the billboard in the virtual universe, as well as the size of the logo and/or the size of the text on the billboard relative to the size of the billboard.

An object in a virtual universe may also be cloned or duplicated in the virtual universe. In other words, a single object may be displayed in two or more locations simultaneously. Object clone control table 318 is a table storing, among other things, object universally unique identifiers, avatar universally unique identifiers, and instance universally unique identifiers. Instance universally unique identifiers are universally unique identifiers assigned to each clone of an object that is created in a virtual environment. Instance universally unique identifiers allow methods to identify and modify the various clones that exist in a virtual universe.

The object methods that may be applied to each clone are stored in object dynamic methods table 320. Object dynamic methods table 320 is a table storing the object methods that may be applied to clones identified in object clone control table 318. In addition, object dynamic methods table 320 may associate each method with a priority. The priority may be used for determining which methods to apply to modify the object and/or the order in which methods may be executed to modify the object in the event that an object is subject to modification by more than one method.

Object size controller 322 is a software program for controlling the size of an object or elements of an object in a virtual universe based on the set of size constraints in object size constraints table 316. The size of an object or an element of an object may be modified in response to a trigger, such as, without limitation, a location of an avatar in relation to an object. For example, as an avatar moves closer to an object, the object may decrease in size to improve the visibility of the object. Decreasing the size of the object may prevent the object from growing too large to the point where the avatar is no longer capable of viewing the object in its entirety. In addition, moving away from an object may cause the object to increase in size to provide improved visibility of the object. Increasing the size of an object, at least temporarily, enables an avatar to view an object and discern any information presented thereon for a greater amount of time.

Clone controller 324 is software for generating clones of objects within a virtual universe. For example, two avatars may view the same object from different distances. The first avatar is further from the object whereas the second avatar is closer to the object. By presenting each avatar with a clone of the object, each clone may be modified using an object method that improves the visibility of the clone for each avatar. The object methods may be selected based on the avatar's distance from the object.

Clone controller 324 may generate a clone of an object for each avatar in a particular range of the object. A range of an object is an area proximate to an object and may include one or more sub regions. For example, a range of an object may include a viewable field and a detection area.

Clone controller 324 initiates the process of generating clones when the location of an avatar is within a range of an object. Clone controller 324 may determine that the avatar's location is in the range of an object by obtaining tracking data that identifies a location of an avatar in relation to a range of an object. The tracking data may be obtained from object based avatar tracking controller 308, object avatar rendering table 306, or any other source of avatar object avatar tracking data.

Each clone that is generated may be rendered according to a different object method. For example, an object method may illuminate a portion of the object, enhance the size of an object, change the color of an object, or remove the effect of another method that otherwise obscures the object. Clone controller 324 stores cloning data into object clone control table 318 for use in tracking the various clones and object methods. The cloning data may include, without limitation, universally unique identifiers (UUID) of objects, avatars, and clones.

Object movement control table 326 is a table for storing the universally unique identifiers of objects and fixed path rules. Each fixed path rule specifies a fixed path along a surface in the virtual universe. An object is permitted to move along the fixed path. The object is not permitted to leave the fixed path when the object is moving along the fixed path. In other words, the fixed path is a route of travel that is fixed or unvarying. The fixed path does not change based on dynamically changing events in the virtual universe, such as locations of avatars, locations of other objects, and so forth. A fixed path is analogous to train tracks in that the fixed path defines a route that does not change just as the path a train travels along on train tracks does not vary away from the tracks. In other words, an object moving along a fixed path cannot leave the fixed path or alter the course of the fixed path. Each fixed path rule identifies a unique fixed path for a particular object to travel along when the given unique fixed path rule is triggered. Avatars and other objects cannot be located at any point along a fixed path. In other words, once a fixed path is specified for a particular object, no other object can be placed in any position on the fixed path. Thus, the fixed path never becomes blocked or obstructed by other objects.

A fixed path rule may optionally also include orientations for the object as the object moves along the fixed path. As an object is moving along a fixed path, the fixed path rules may permit the object to pivot to the left, pivot to the right, rotate about an axis, tilt up, tilt down, and/or make any other change in orientation to enable one or more avatars to better view the object as the object moves along the fixed path. For example, if an object moving along a fixed path is facing away from an avatar within a viewable field of the object, the object can rotate about an axis without leaving the fixed path so that the front of the object is facing the front of the avatar. This re-orientation of the object improves the visibility of the object as the object moves along the fixed path.

A particular fixed path rule is implemented to control fixed path transitions made to a selected object based on trigger conditions. For example, and without limitation, a first trigger condition triggers a first fixed path that moves the object along a fixed path to the right while a different trigger condition triggers a different, second, fixed path that moves the object along a fixed path to the left and then doubles back to the right. In another example, a trigger condition in which a group of two or more avatars are standing in a group triggers a fixed path rule that modifies the selected object to move along a fixed path that circles around the group of avatars. A different trigger may cause the object to move along a fixed path that forms a square shape.

A fixed path rule may also be a path that moves an object through the air or above a surface as opposed to a path on the ground. In the example above in which a group of avatars triggers a fixed path rule, the fixed path rule may move the object along a fixed path that circles around the group at ground level or trigger a fixed path rule that moves the object along a fixed path that loops around the group at fifteen feet above the ground. Thus, a fixed path may be a fixed path along the ground or a fixed path that is a given distance above the ground. Object movement control table 326 may include a hierarchy for each fixed path rule.

Fixed path controller 328 is software for implementing fixed path transitions to move objects along a fixed path in the virtual universe to ensure greater time seen by users and improved quality of viewing by users. Fixed path controller 328 moves an object along a predefined, fixed path and optionally modifies an orientation of the object based on an occurrence of one or more trigger conditions. Fixed path controller 328 determines whether one or more conditions for a trigger have occurred based on input that enables fixed path controller 328 to determine a location and/or orientation of one or more avatars relative to one or more selected objects. In one embodiment, fixed path controller 328 uses input, such as, without limitation, tracking data, to determine whether conditions for a given trigger for a fixed path rule is satisfied.

When multiple fixed path rules are triggered, fixed path controller 328 determines which fixed path rule has priority based on the fixed path rules' positions in the hierarchy of flotation rules. A fixed path rule with a higher position in the hierarchy is implemented rather than a fixed path rule with a lower position in the hierarchy. In this example, the fixed path rule with the lower position in the hierarchy is not implemented at all.

In another embodiment, the hierarchy of fixed path rules is implemented by ordering the fixed path rules. Application logic in fixed path controller 328 determines which rule is implemented first based on the position of each fixed path rule in the hierarchy. The fixed path rule with a higher position in the hierarchy is implemented first. The fixed path rule with the second highest position in the hierarchy is implemented second. In other words, the fixed path rules are implemented consecutively, one after the other, in accordance with the hierarchy of rules.

In another embodiment, object movement control table 326 comprises a field for each fixed path rule that designates the hierarchy of each fixed path rule. The field may designate the hierarchy of each fixed path rule by using any type of indicator, such as, without limitation, by a numeric indicator, an alphanumeric indicator, or other designation indicating which fixed path rule has priority. For example, and without limitation, a rule with a higher number in the field is given priority over a rule with a lower number. Object movement control table 326 may also optionally store a priority for each fixed path rule. The priority indicates which fixed path rule takes priority when conditions are met for initiating two or more fixed path rules. When two or more fixed path rules are triggered, object movement control table 326 determines which fixed path rule has priority based on the priority indication and/or the flotation rules position in the hierarchy of flotation rules. In other words, a first fixed path that moves an object along a path in a northwest direction may be given priority over a second fixed path that moves the object along a path towards the south if there are three avatars to the north and only one avatar to the south, even if the second fixed path has a higher position in the hierarchy than the first fixed path.

Moving rules table 330 is a table storing templates for fixed path rules. In this embodiment, moving rules table 330 is a separate table than object movement control table 326. However, in another embodiment, moving rules table 330 is included within object movement control table 326 rather than being implemented as a separate table.

Color control table 332 is a data structure that includes a set of pixel color constraints. The set of pixel color constraints is one or more rules or limitations that provide a range of color modifications that may be performed on an object in a virtual universe. The set of pixel color constraints may specify an acceptable upper and lower RGB values that may be applied to an object. For example, an object in a virtual universe may be a soda can displaying a company's trademark red and white colors. The set of pixel color constraints may control the range of colors with which the object and/or the trademarked colors are rendered and presented to an avatar in a virtual universe. Thus, the soda can's red and white colors may be maintained within a range of shades of red and white that permits a user encountering the soda can to quickly and easily associate the trademarked colors and design with the trademark owner. In addition, the set of pixel color constraints may also be used to prevent calculated RGB values from exceeding a range of permissible values. For example, a color may have RGB values between the permissible range of 0 to 255. If an object's color is modified according to a mathematical equation that results in an RGB value outside the range of 0 to 255, the set of pixel color constraints may specify the upper limit of 255 and the lower limit of 0.

In one embodiment, an object in a virtual universe is modified in relation to all avatars within the range of the object. Thus, if two or more avatars are in the range of the same object, the object may be modified by an appropriate software controller for rendering the object in a manner that accommodates the circumstances of each avatar. For example, if a first avatar in the range of the object is wearing sunglasses and a second avatar is not, then the object's color may be modified to accommodate both avatars. In particular, the object's color may be altered in a manner to make the object both more visible to the first and second avatar.

In an alternate embodiment, the geometric and texture modification modifies the object for each avatar in the range of the object to present each avatar in the range with a clone of the object. Thus, the first avatar wearing sunglasses would be presented with a clone of the object to make the object more viewable to the avatar wearing sunglasses. Similarly, the second avatar may be presented with a clone of the object to remove glare. If each avatar is presented with an instance of the object, then different object methods may be applied to each object instance depending upon the unique circumstances of each avatar. Thus, each clone that is generated may be rendered according to a different geometric and texture modification method. For example, an object method may illuminate a portion of the object, enhance the size of an object, change the color of an object, or remove the effect of another method that otherwise obscures the object.

Objects in a virtual universe are rendered in colors that may be specified by data stored in color table 334. Color table 334 is a data structure storing pixel color values. A pixel color value is data describing an object's colors. Pixel color values may be numerical values between 0 and 255 corresponding to the range of values used in an RGB scale. The data stored in pixel color values may describe the color of individual pixels or a group of pixels of an object.

Modification of object colors is performed by color controller 336. Color controller 336 is a software program for controlling the color of an object in a virtual universe. In particular, color controller 336 is capable of modifying the color of an object based upon object methods invoked on the object. In addition, color controller 336 may modify the color of an object based on display setting data. Display setting data is data derived from the display settings of video controller. The video controller is a component of a client's computer controlling display settings. The video controller may be a hardware component, software component, or a combination of hardware and software. For example, the Microsoft Windows™ platform implements the CIM_VideoBIOSElement class for configuring and querying video controller and display settings. In addition, display manufacturers may also implement other interfaces for querying display settings. Display settings include, for example, saturation, brightness, contrast, and hue. Display setting data may take any form of data, including RGB values. The RGB values may be converted from display settings of the video controller using any available conversion algorithm, such as the algorithms discussed above.

Color controller 336 may generate display setting data from the display settings of video controller. Once generated, color controller 336 may store display setting data in display setting table 338. Display setting table 338 is a data structure storing display setting data. Color controller 336 may reference display setting data to determine whether an object's color should be modified based upon a user's display settings. For example, color controller 336 may modify the object's color when there is a delta display setting. The delta display setting is a difference between the optimal display settings and a user's selected display settings. In one embodiment, delta display settings may be identified by comparing RGB values of the user's selected display settings with RGB values corresponding to a display device's or video controller's optimal display settings. If a delta value exists, then color controller 336 may calculate set of color modifiers to form a modified color of the object. The set of color modifiers is one or more modifiers that may be applied to pixel color values to offset the effects of a user's display settings. The set of color modifiers may include, for example, a modifier to modify an object's brightness, saturation, hue, or an object's primary colors.

Once a modified color of the object is formed, the object may then be rendered using the modified color so that a user viewing the object perceives the object as though the object is rendered according to the optimal display settings for the object. For example, a user's display settings may be set to a low contrast level. Consequently, color controller 336 may detect the low contrast level as a predefined condition. As a result, color controller 336 may calculate a set of color modifiers to change the RGB values of the object to increase the contrast of a set of objects in the avatar's view. The RGB values may be increased until the contrast is within an acceptable range of RGB values as set forth in the set of pixel color constraints. Similarly, color controller 336 may change the RGB values of the set of objects based on the brightness, hue, and saturation of a user's selected display settings.

User priority table 340 is a table that stores universally unique identifiers (UUID) for selected objects and one or more rules for implementing geometric and texture modifications to a selected object based on the real world identities of one or more users controlling one or more avatars within the viewable field of the selected object. The priority rules may specify that a user that has never viewed the object is given priority over a user that has viewed the object on previous occasions. The priority rules may specify that a user with an excellent credit rating is given priority over a user with average or bad credit. The priority rules may give priority to users with a past purchase history indicating that the user typically purchases expensive, brand name merchandise over users that typically purchase discount or generic brand merchandise.

User priority controller 342 controls the implementation of one or more geometric and texture modifications to an object based on the real world identities of users controlling avatars within the viewable field of the object. A geometric and texture modification may include, without limitation, cloning an object, changing a size of an object or element of the object, floating the object, moving the object along a fixed path, or any other modification of the object.

User priority controller 342 sends query 344 to set of sources 346 to request user information 348 associated with the real world identities of the users controlling avatars in the viewable field of the object from set of sources 346. User information 348 is information describing the users' identities, characteristics, and any other information associated with the users controlling avatars in the virtual universe.

Set of sources 346 is a set of one or more sources of information describing users and the real world identities of the users. Set of sources may include both online sources that are available over a network connection, as well as offline sources, such as local data storage device. External database 352 is an example of a remote look-up table containing user information 348 that may be accessed by user priority controller 342 via a network connection. User information 348 may include a user's name, age, date of birth, level of education, address/residence, profession, place of employment, information on children and pets, past purchases, club memberships, credit rating/credit history, purchasing trends and purchasing tendencies of the user, hobbies, habits, medical information, or any other information. For example, user information 348 may indicate the user is a diabetic and frequently purchases discount and generic items rather than more expensive name brand items. User information 348 may indicate another user is a recovering alcoholic and a smoker. User information 348 may indicate name brands that are typically purchased or preferred by the user. In other words, user information 348 may include any information associated with the user that may be used to prioritize avatars in the viewable field of the object and modify the object to increase the visibility of the object to one or more users having the highest priority.

Set of sources 346 may also include information provided by a user using user input/output 350. User input/output 350 may be implemented in any type of user interface for receiving user input and providing output to the user, such as, without limitation, a graphical user interface, a command line interface, a menu driven interface, a keyboard, a mouse, a touch screen, a voice-recognition system, or any other type of input/output device. User input/output 350 formats the user input into a form that can be processed by user priority controller 342 and then stored on a local data storage component on server 300 or on a remote data storage device. For example, a user may choose to enter a preference into user information 348 indicating that the user does not want to see any advertising for pet products because the user is allergic to dogs, cats, and other animals. User priority controller 342 uses this information to give the user a low priority when an object is advertising pet products. User priority controller 342 may then initiate one or more geometric and texture modifications to increase the visibility of the object advertising pet products to other users and/or decrease the visibility of the object to the user that is allergic to animals.

User information 348 is sent to user priority controller 342 in response to query 344. In this example, query 344 is a single query. However, query 344 may be multiple queries sent to a plurality of different sources of information. For example, a query may be sent to a credit reporting agency, a user information look-up table maintained by server 300, and a retail purchase history tracking system that maintains information describing the user's past purchase trends and preferences. The information describing the user's past purchase history may be purchased from one or more retail businesses that maintain records of products sold to particular customers.

In this embodiment, user priority controller 342 determines a real world identity of a user in response to object based avatar tracking controller 308 detecting a presence of one or more avatars controlled by the user entering a viewable field of an object that advertises a new, top of the line memory upgrade. The real world identity may be obtained from the user's registration information obtained when the user registered and/or by querying set of sources 346 for user information 348. User priority controller 342 may optionally assign a priority to each avatar and/or assign a priority to each cluster of avatars within the viewable field. In other words, if two avatars are close together in front of the object and one avatar is behind the object, a priority may be assigned to each individual avatar based on the real world identities of the users controlling the avatars.

In addition, a priority may be assigned to the group of two avatars in front of the object and a priority may be assigned to the group of only one avatar behind the object. Thus, if the avatar behind the object is a user that typically purchases expensive, top of the line computer products and the two avatars in front of the object are users that have average to low credit ratings and rarely purchase computer products, a higher priority will be given to the group of one avatar behind the object and a lower priority is given to the group of two avatars in front of the object. In response, the object may be modified to change a size of the object, rotate the object, and float the object to increase the visibility of the object to the group of one avatar.

User priority controller 342 generates a temporary and dynamic rule to control modifications of the object based on the user information for every user controlling an avatar within the viewable field of the object and based on the priority rules in user priority table 340. User priority controller 342 initiates one or more geometric and texture modifications to modify the object in accordance with the temporary and dynamic rule. When the avatar controlled by the user moves outside the viewable field of the object, the temporary and dynamic rule is disregarded and the original geometric and texture modifications of the object are restored.

Figure 4:
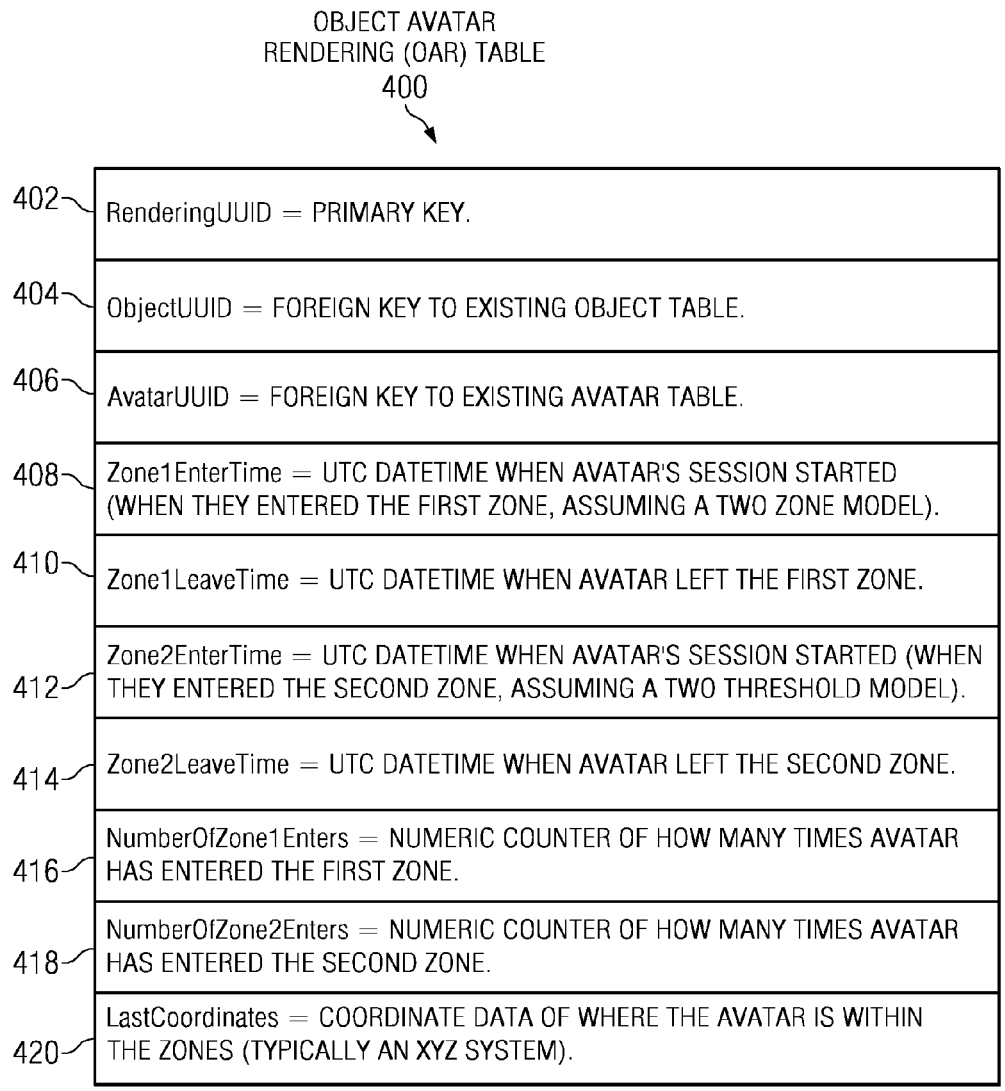
FIG. 4 is a block diagram of an object avatar rendering table in accordance with an illustrative embodiment.

FIG. 4 is a block diagram of an object avatar rendering table in accordance with an illustrative embodiment. Object avatar rendering table 400 is an example of data in an object avatar rendering table, such as object avatar rendering table 306 in FIG. 3.

RenderingUUID 402 is a primary key for object avatar rendering table 400. ObjectUUID 404 is a universally unique identifier for a selected object in a virtual universe. Object UUID 404 is also a foreign key to the existing object table. AvatarUUID 406 is a foreign key to an existing avatar table. AvatarUUID 406 includes a unique identifier for each avatar in the viewable field of the object associated with objectUUID 404.

Zone1EnterTime 408 is a field of a date and/or time when an avatar enters a first zone within the viewable field of an object. In this example, the zone 1 enter time is a time when an avatar entered the first zone, assuming a model with two or more zones. Zone1LeaveTime 410 is a field for a date and/or time when the avatar leaves the first zone. Zone2EnterTime 412 is a field in object avatar rendering table 400 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 414 is a field for storing the date and/or time when a given avatar leaves the second zone.

NumberofZone1Enters 416 is a field for storing the number of times a particular avatar has entered the first zone. This information may be useful to determine whether the user has never viewed the object and therefore content associated with an object should be displayed in full to the user associated with the avatar. The information in NumberofZone1Enters 416 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 418 is a field for storing the number of times an avatar has entered the second zone. LastCoordinates 420 is a field for storing the coordinate data describing where a given avatar is within the first zone or the second zone of a selected object. The coordinate data is typically given in xyz type coordinate data.

Figure 5:
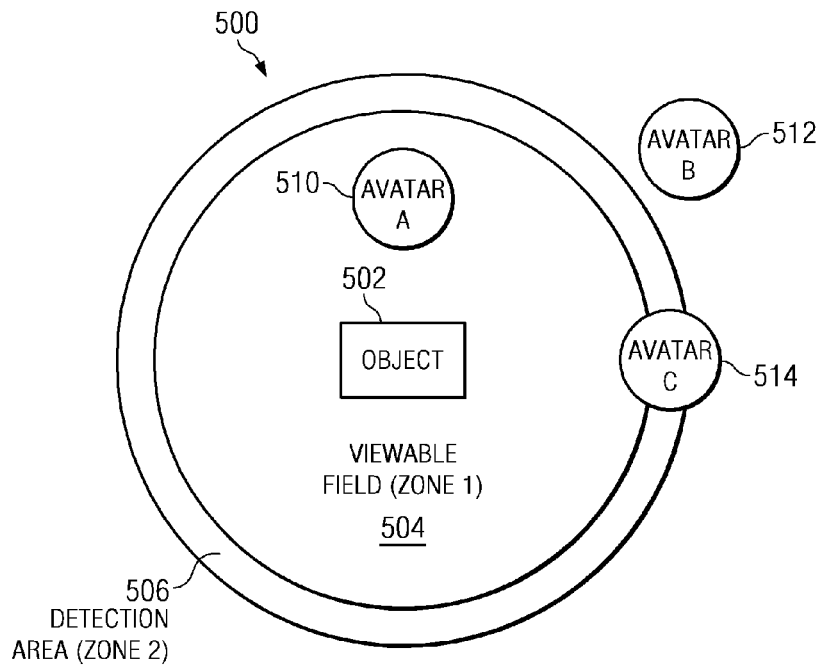
FIG. 5 is a block diagram of a viewable area for an object in accordance with an illustrative embodiment.

FIG. 5 is a block diagram of a viewable area for an object in accordance with an illustrative embodiment. Range 500 is a viewable field 504 and detection area 506 associated with object 502 in a virtual universe. An object, such as object 502, is an element in a virtual universe that is not directly controlled by a user or associated with a user's account. An object may be, for example, buildings, statues, billboards, signs, and advertisements in the virtual universe. In this example, object 502 is an advertisement, such as a billboard or a sign.

Viewable field 504 has a focal point or center at a location that is the same as the location of object 502. Viewable field 504 may also be referred to as zone 1 or a first zone. An avatar in viewable field 504 is able to see or view object 502 and/or content associated with object 502. For example, object 502 may be associated with video and/or audio content. Object 502 may also optionally have some movement associated with the object. For example, object 502 may be capable of some limited movement or animation. However, in this example, object 502 is substantially limited to a single location in the virtual universe.

Object 502 is rendered on a user's screen when an avatar associated with the user is within viewable field 504. Object 502 is rendered using any perspective mode, including but not limited to, a first person perspective, a third person perspective, a bird's eye view perspective, or a map view perspective. A map view perspective renders objects with labels rather than with extensive details and/or texturing.

Detection area 506 is an area adjacent to viewable field 504 within range 500. Detection area 506 may also be referred to as a second zone or zone 2. An avatar in detection area 506 cannot see object 502 or view content associated with object 502. However, when an avatar enters detection area 506, the object avatar tracking controller software can begin preparing to display object 502 and content associated with object 502 to the avatar when the avatar enters viewable field 504.

In this example, avatar A 510 is within viewable field 504. Therefore, avatar A 510 is able to view or see object 502. Avatar C 514 is within detection area 506. Avatar C 514 is not able to see or view object 502. However, the presence of avatar C 514 indicates that avatar C 514 may be about to enter viewable field 504 or that avatar C 514 has just left viewable field 504. Avatar B 512 is outside range 500. Avatar B 512 is not able to see or view object 502. In addition, avatar B 512 is not close enough to viewable field 504 to indicate that avatar B 512 may be preparing to enter viewable field 504. Therefore, an object avatar tracking table for object 502 includes entries for avatar A 510 in zone 1 and avatar C 514 in zone 2. However, in this example, the record associated with object 502 in the object avatar rendering table does not include an avatar unique identifier or data for avatar B 512 because avatar B 512 is outside both viewable field 504 and detection area 506.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 6:
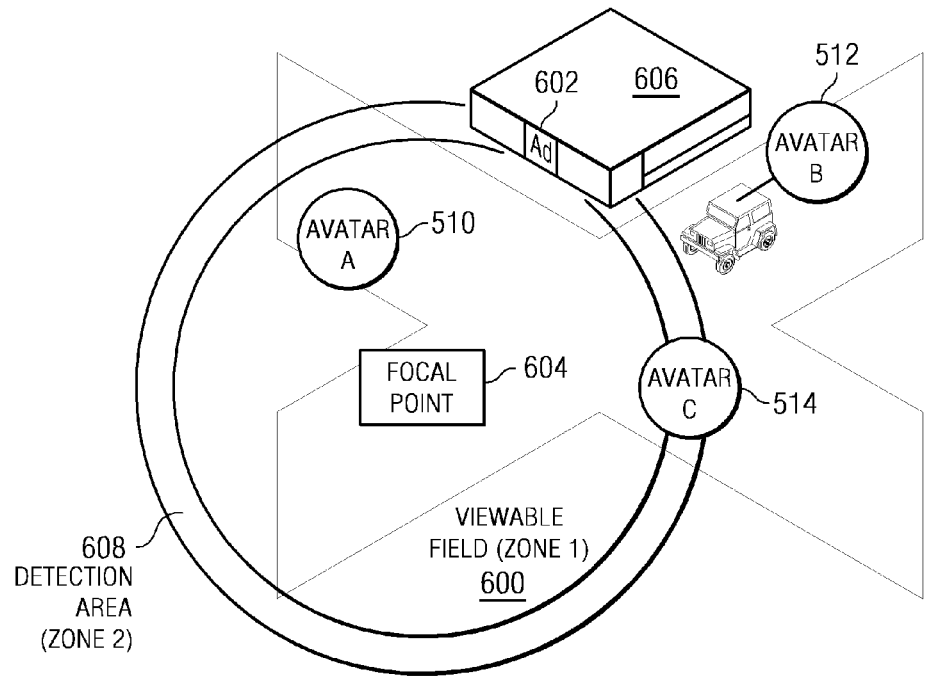
FIG. 6 is a block diagram of a viewable area for an object having a focal point at a location other than the location of the object in accordance with an illustrative embodiment.

FIG. 6 is a block diagram of a viewable area for an object having a focal point at a location other than the location of the object in accordance with an illustrative embodiment. Viewable field 600 is a viewable field for object 602. In this example, object 602 is an advertisement in front of object 606. Viewable field 600 is a range in which an avatar, such as avatars 510-514, may view object 606. An avatar can see object 602 if the avatar is within viewable field 600.

Viewable field 600 has focal point 604. Focal point 604 is a point from which the range or area of viewable field 600 for object 602 is determined. In other words, viewable field 600 is an area that is identified based on a predetermined radius or distance from focal point 604. Here, focal point 604 is a location that is different from the location of object 602 because object 602 is adjacent to an obstructing object. In this example, the obstructing object is object 606.

In this example, when avatar C 514 comes in range of detection area 608 of object 602, object based avatar tracking controller, such as object based avatar tracking controller 306 in FIG. 3, makes a determination as to whether there is an existing session associated with the unique identifier of object 602 and the unique identifier of avatar C 514. This step may be implemented by making a query to the object avatar rendering table to determine if avatar C 514 has ever entered zone 2 or zone 1 previously. If there is not an existing session for avatar C 514, the object based avatar tracking controller creates a record in the object avatar rendering table with the unique identifier of object 602 and the unique identifier of avatar C 514.

The record in the object avatar rendering table may optionally include additional information, such as, without limitation, a date and time when avatar C 514 entered zone 2, a date and time when avatar C 514 leaves zone 2, a date and time when avatar C 514 enters zone 1, a number of zone 2 enters, a number of zone 1 enters, coordinates of avatar C 514, and any other data describing avatar C 514. This data is used by the virtual universe grid software for analysis, reporting, and billing purposes.

Object 602 may have an initiation process associated with object 602. For example, if object 602 is an advertisement with an audio and video content associated with viewing object 602, an initiation process may include buffering the audio and/or video content, checking a cache for the audio and/or video content, caching the audio and/or video content, or any other initiation process.

When avatar C 514 enters detection area 608, the object-based avatar tracking controller triggers any object initiation process defined by object 602. When avatar C 514 enters viewable field (zone 1) 600, the object based avatar tracking controller displays the buffered or cached content. If a user is viewing the object for the first time and object 602 has a video or audio file associated with viewing the object, the process starts playing the video or audio from the beginning.

If a session already exists, the object based avatar tracking controller triggers any object re-initiation process defined by object 602. For example, if the user is not viewing an object with an associated video for the first time, the process starts playing the video at a point in the video after the beginning, such as after an introduction, in a middle part, or near the end of the video to avoid replaying introductory material.

The object based avatar tracking controller makes a determination as to whether the position of avatar C 514 has changed. Changing position may include traveling, turning, walking, or disappearing, such as teleporting, logging off, or disconnecting. When avatar C's 514 position changes, the object based avatar tracking controller adds the user position data to the object avatar rendering table, such as at a field for LastCoordinates 420 in FIG. 4. The user position data includes angle of view coordinate data of the avatar relative to object 602 and the distance of avatar C 514 to object 602.

The object based avatar tracking controller performs an analysis of the position data and modifies object 602 according to one or more geometric and texture modification methods (GTMs) to improve visibility of the object.

When avatar C 514 is out of range of viewable field 600 and detection area 606, the object based avatar tracking controller logs a session pause for the session associated with avatar C 514. The log may include the date and time of the session pause. When the session has been paused for an amount of time that exceeds a threshold amount of time, the object based avatar tracking controller terminates the session associated with avatar C 514. The process termination may include, without limitation, removing the records and data associated with avatar C 514 from the object avatar rendering table. If the record is not deleted, when avatar C 514 comes back into range of zone 1 or zone 2 of object 602, the object based avatar tracking controller determines that an existing session associated with the unique identifier of object 602 and a unique identifier of avatar C 514 already exist. In such a case, a new record for avatar C 514 will not be created. Instead, the data in the object based avatar rendering table will be updated with new data regarding avatar C 514 in the range of object 602.

Figure 7:
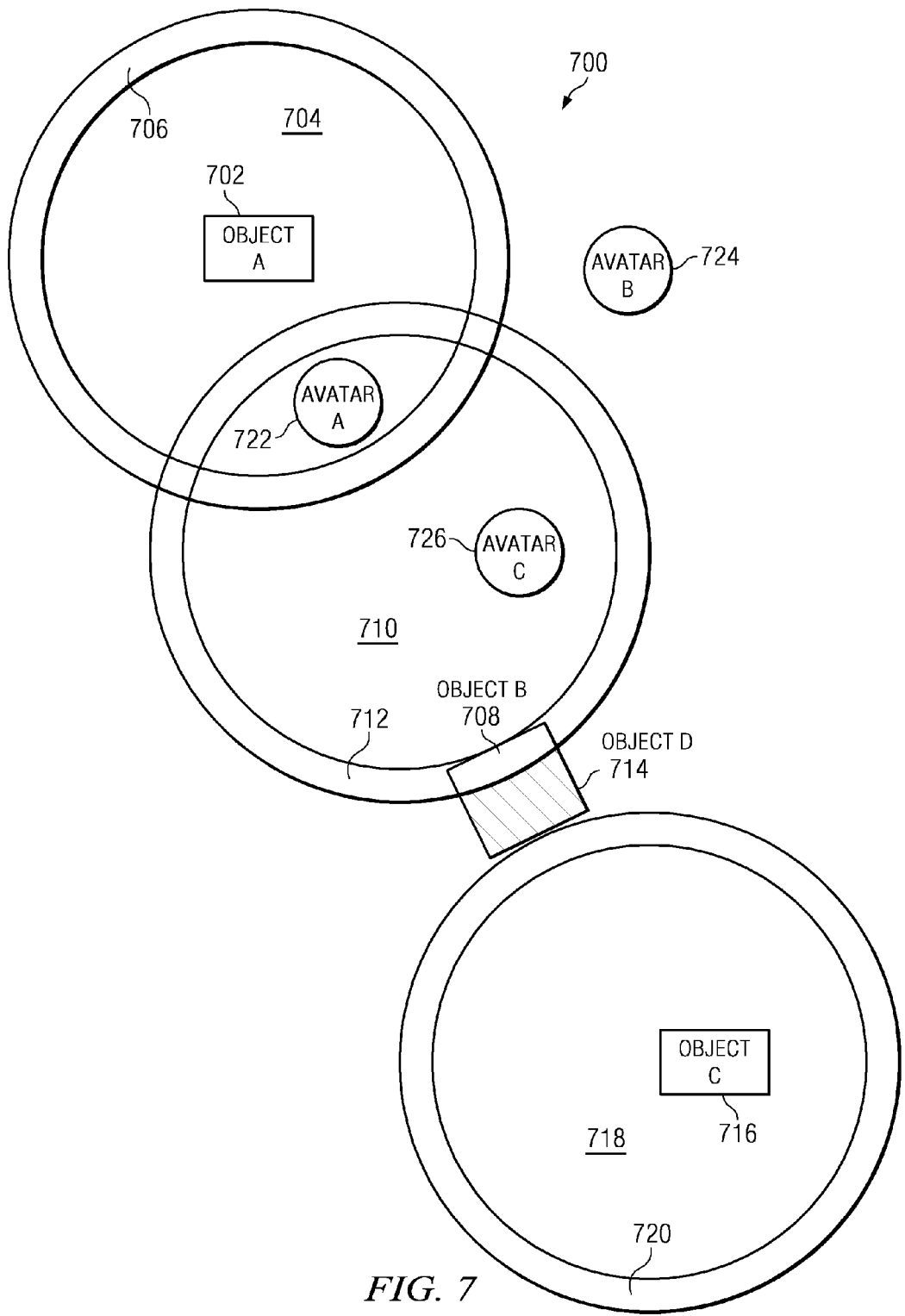
FIG. 7 is a block diagram of viewable areas for a plurality of objects in accordance with an illustrative embodiment.

FIG. 7 is a block diagram of viewable areas for a plurality of objects in accordance with an illustrative embodiment. Region 700 is a region in a virtual universe. Region 700 is associated with a server, such as server 104 in FIG. 1. Each region in a virtual universe is typically supported by a different server.

Object A 702 is associated with viewable field (zone 1) 704. Object A 702 may also optionally have a detection area (zone 2) 706. Viewable field (zone 1) 710 is a viewable area associated with object B 708. Object B 708 may also have detection area (zone 2) 712. In this example, viewable field 710 overlaps in part with a portion of viewable field 704. Object B 708 has a focal point of viewable field 710 that is at a location other than a location of object B 708 because object B 708 is partially obstructed by object D 714. Object C 716 is associated with viewable field 718. Object C 716 is optionally associated with detection area (zone 2) 720.

In this example, avatar A 722 is within viewable field 704 of object A 702 and viewable field 710 of object B 708. In other words, avatar A 722 can see object A 702 or object B 708. Avatar C 726 is within viewable field 710 of object B 708. Avatar C 726 is able to see or view object B 708. Avatar B 724 is outside the viewable fields of objects 702, 708, 714, and 716.

FIG. 8 is a block diagram of an object based avatar table for a plurality of objects in accordance with an illustrative embodiment. Object based avatar table 800 is an object based avatar table for a plurality of selected objects. In this example, object based avatar table 800 includes a unique identifier for selected object A 802 and object B 820. Data describing avatars for each selected object is also included.

For example, object based avatar table 800 includes avatar A UUID 804, avatar A zone 1 enter time 806, avatar A zone 2 enter time 808, avatar A zone 1 leave time 810, and avatar A zone 2 leave time 812. Object based avatar table 800 includes data regarding avatars associated with zone 1 and zone 2 of object B 820. For example, and without limitation, object based avatar table 800 includes avatar A UUID 822, avatar A zone 1 enter time 824, avatar A zone 2 enter time 826, avatar A zone 1 leave time 828, avatar A zone 2 leave time 830, avatar C UUID 832, avatar C zone 1 enter time 834, avatar C zone 2 enter time 836, avatar C zone 1 leave time 838, and avatar C zone 2 leave time 840.

The fields and data shown in object based avatar table 800 are only examples of fields and data that may be included in an object based avatar table. However, implementations of object based avatar tables are not limited to only including the data and/or fields shown in FIG. 8. An object based avatar table may include additional data and/or additional fields not shown in FIG. 8.

In addition, object based avatar table 800 in this example only includes data and fields for two objects and two different avatars. However, an object based avatar table may include fields and/or data for any number of objects and any number of avatars. In other words, object based avatar table 800 may include fields and/or data for a single object, as well as two or more objects. Likewise, object based avatar table 800 may include fields and/or data for tracking a single avatar associated with each object, as well as two or more avatars associated with each object's viewable field and/or detection area. In addition, an object based avatar table may be implemented with fields in more than one table, such as with foreign keys related to primary keys in a relational database.

Figure 9:
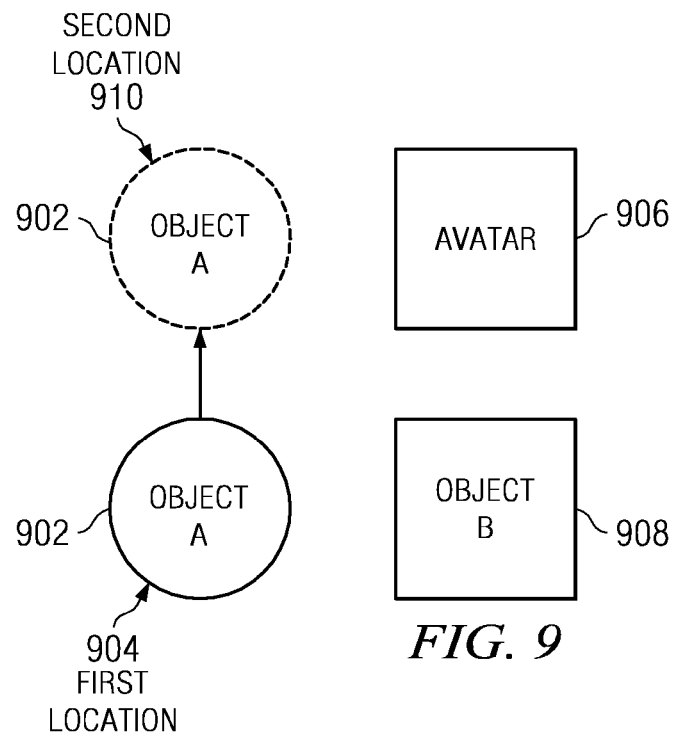
FIG. 9 is a block diagram of a floating object in accordance with an illustrative embodiment.

FIG. 9 is a block diagram of a floating object in accordance with an illustrative embodiment. Object A 902 is a selected object. A unique identifier for object A 902 is included in an object floating control table, such as object floating control table 308 in FIG. 3 and object floating control table 310 in FIG. 3.

When object A 902 is in first location 904, object A 902 is obscured from view by a user associated with avatar 906 due to obscuring object B 908. When a trigger event occurs, such as, without limitation, avatar 906 entering a field of view of object A 902, an object floating controller initiates a floating transition of object A 902. The floating transition may include, without limitation, floating object A 902 above a surface, tilting or reorienting object A 902, teleporting or relocating object A 902 to a different location, moving object A 902 in a bobbing motion along a fixed path, moving object A 902 in a zigzag or side to side motion as object A 902 moves along a fixed path, turning object A 902 forty-five degrees, turning object A 902 ninety degrees, and/or turning object A 902 one hundred and eighty degrees, and/or any other floating transitions implemented as object A 902 moves along one or more fixed paths.

In this example, the floating rules move object A 902 up and down from first location 904 to second location 910. Object A 902 transitions from first location 904 to floating above a surface at second location 910 repeatedly or cyclically to attract the attention of avatar 906 and/or increase the ability of the user associated with avatar 906 to view object A 902.

Figure 10:
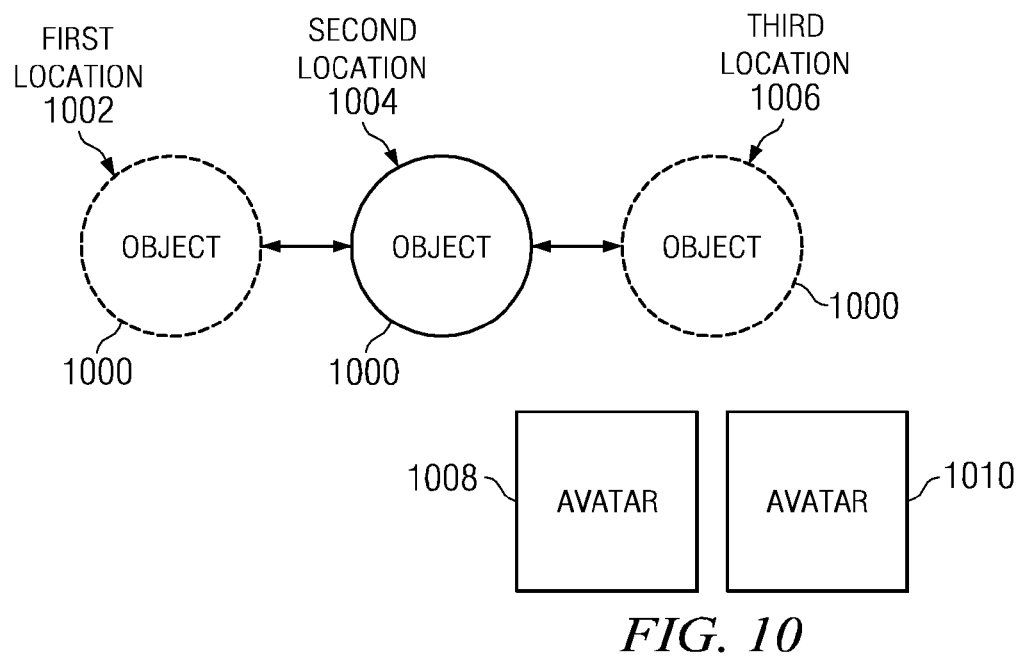
FIG. 10 is a block diagram of another floating object in accordance with an illustrative embodiment.

FIG. 10 is a block diagram of another floating object in accordance with an illustrative embodiment. Object 1000 is a selected object. Object 1000 is floating in accordance with flotation rules associated with object 1000. The flotation rules are stored in an object floating control table, such as object floating control table 318 in FIG. 3. A floating object controller uses the flotation rules to determine when and where object 1000 is able to float.

In this example, floating object controller moves object 1000 from first location 1002 along a floating path to second location 1004 and then to third location 1006. The path from first location 1002 to second location 1004 and third location 1006 is a fixed path floating along a straight line above a surface that is determined based on flotation rules, constraints, and limitations in the object floating control table and the fixed path rules in object movement control table. Floating object 1000 increases the visibility of object 1000 to avatars within a range of object 1000, such as avatar 1008 and 1010.

Figure 11:
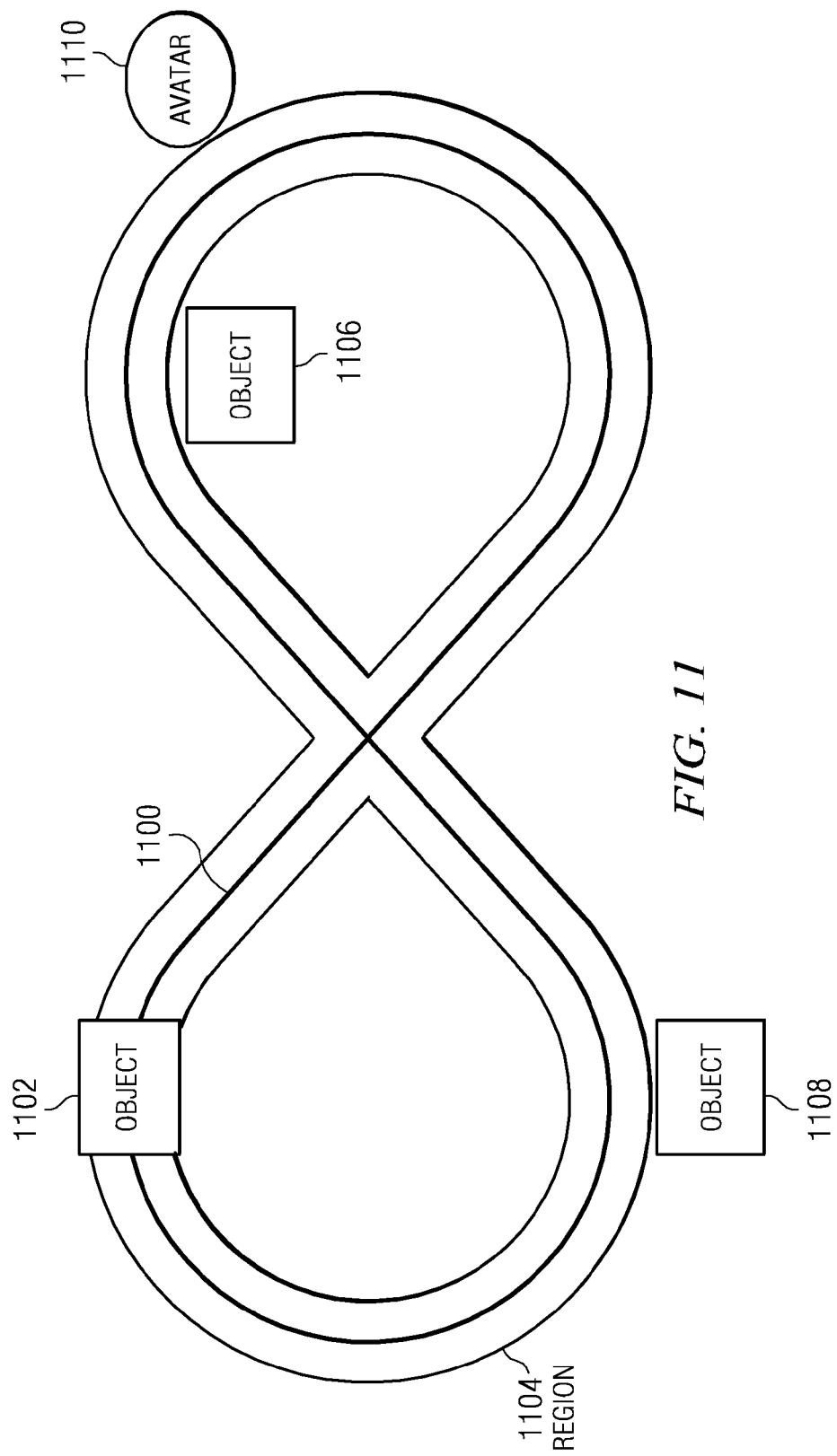
FIG. 11 is a block diagram of an object moving along a fixed path in accordance with an illustrative embodiment.

FIG. 11 is a block diagram of an object moving along a fixed path in accordance with an illustrative embodiment. Fixed path 1100 is a course, route, or path in a virtual universe environment. Fixed path 1100 is defined by a fixed path rule in an object movement control table, such as object movement control table 311 in FIG. 3. Fixed path 1100 may be a fixed path along a surface. A surface includes, without limitation, the ground, a bridge or a roadway. Fixed path 1100 may also be implemented as a fixed path floating a predetermined distance above a surface.

Object 1102 moves along fixed path 1100 at a speed defined by the fixed path rule. The fixed path rule may specify the speed at which object 1102 moves, a rate of acceleration as object 1102 moves, a rate of deceleration as object 1102 moves along the path, points along the path at which object 1102 will stop or pause for a predetermined amount of time before resuming movement along fixed path 1100, a number of circuits around fixed path 1100 that object 1102 will traverse, a direction of travel along fixed path 1100, such as, moving forward or reversing direction to backtrack along fixed path 1100, and/or a number of objects that may travel along fixed path 1100 simultaneously. In other words, the fixed path rule specifies how many objects may be moving along fixed path 1100 at the same time, when and where each object moving along fixed path 1100 starts moving and stops moving, and/or how fast each object moves along fixed path 1100.

Only selected objects associated with fixed path 1100, such as object 1102, can move along fixed path 1100. Other objects, such as objects 1106-1108 cannot be located on fixed path. In other words, other objects cannot obstruct or block fixed path 1100 because fixed path 1100 reserves or blocks the space required for object 1102 to move along fixed path 1100.

The fixed path rule may also define region 1104 bordering fixed path 1100. Region 1104 reserves or takes up additional space bordering fixed path 1100 to permit object 1102 and/or any other selected objects moving along fixed path 1100 to pivot, tilt, rotate, or otherwise re-orient as the selected objects are moving along fixed path 1100. In other words, fixed path 1100 reserves enough space for object 1102 to move along fixed path 1100 without object 1102 changing position, turning, pivoting, rotating, tilting, or changing orientation. Region 1104 is an area surrounding or adjacent to fixed path 1100 that reserves additional space to permit object 1102 to turn, rock, pivot, tilt, rotate, or otherwise reorient as object 1102 moves along fixed path 1100. It may be desirable to change the orientation of object 1102 to better enable users to view object 1102. For example, as object 1102 moves along fixed path 1100, object 1102 may be facing object 1108. As object 1102 continues to move along fixed path 1100 towards avatar 1110, the fixed path controller rotates object 1102 about an axis so that a front face of object 1102 will be facing towards avatar 1110 rather than facing towards object 1108.

In another embodiment, the speed, velocity, acceleration, deceleration, and number of times an object travels along a fixed path is determined dynamically based on the changing locations of avatars and other objects in the virtual universe environment rather than utilizing a predefined speed, velocity, acceleration, deceleration, and number of times to travel the fixed path defined in the fixed path rule.

In FIG. 11, fixed path 1100 is in the shape of a FIG. 8. However, fixed path 1100 may be any predetermined path having any predetermined shape. For example, and without limitation, fixed path 1100 may be a path along a straight line, a circle shaped path, a square shaped path, a crescent shaped or curved path, an undulating or wave form shaped path, a criss-cross path, or any other predetermined path. In addition, fixed path 1100 may include one or more locations at which an object moving along fixed path 1100 will be floated above a previous position on fixed path 1100 at a predetermined height for a predetermined period of time before returning to a previous position on fixed path 1100.

In another embodiment, fixed path 1100 is a path that is located partially along a surface and partially floating a predetermined distance above the surface. Thus, an object moving along a fixed path may be moving along a surface, such as the ground, a road, or a sidewalk, and then begin floating along a portion of the fixed path that is located a predetermined distance above the ground. The predetermined distance may be a single fixed distance or a set of distances such that the object floating along fixed path 1100 changes heights or distances above the surface. For example, if fixed path 1100 is a straight line path between point A and point B, an object moving along fixed path 1100 floating above the ground, may change heights from eight feet above the ground to ten feet above the ground along the length of fixed path 1100. In this example, the object moving along fixed path 1100 would appear to be bobbing up and down in a waving or undulating motion between eight and ten feet above the ground as the object moves from point A to point B. Thus, an object may move in an undulating motion between two or more heights above a surface as the object floats along fixed path 1100.

Figure 12:
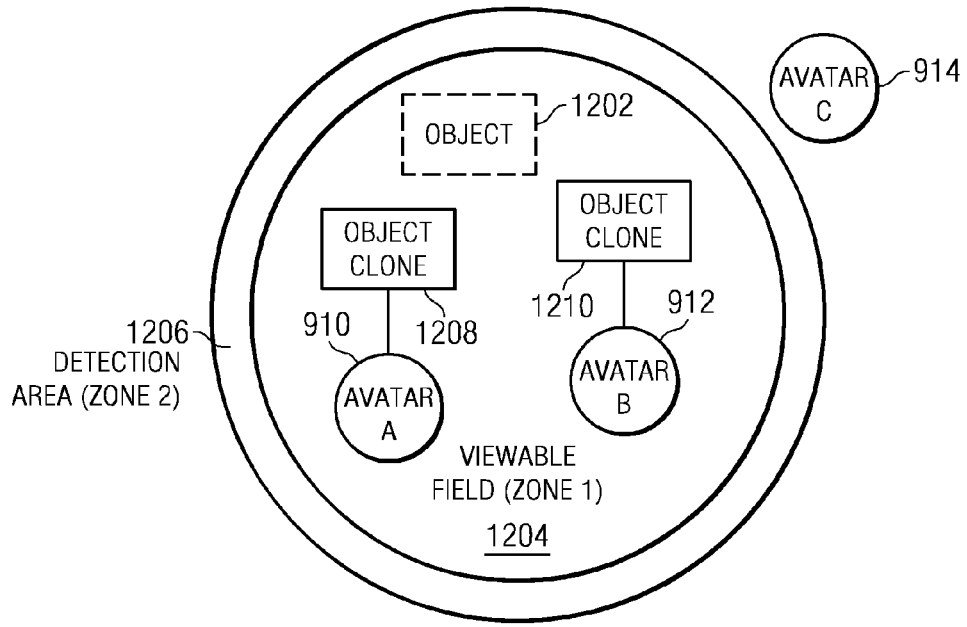
FIG. 12 is a block diagram of an object based avatar table for a plurality of objects in accordance with an illustrative embodiment.

FIG. 12 is a block diagram of a set of clones presented to a set of avatars in accordance with an illustrative embodiment. The set of clones are clones of object 1202.

Object 1202 is associated with a range having viewable field 1204 and detection area 1206. In this example, avatar A 910 and avatar B 912 are located within viewable field 1204. Avatar C 914 is located outside of the range of object 1202.

Because avatar A 910 and avatar B 912 are located within viewable field 1204, avatar A 910 and avatar B 912 are presented with object clone 1208 and object clone 1210, respectively. Object clones 1208 and 1210 are clones of object 1202. Each clone of object 1202 may be rendered differently according to the various methods associated therewith. For example, because avatar A 910 is located further from object 1202, then object clone 1208 may be a clone of object 1202 modified by a geometric and texture modification method that enhances the size of object 1202.

In addition, because avatar B 912 is located closer to object 1202, but at an angle to object 1202, then object clone 1210 may be a clone of object 1202 modified by a geometric and texture modification method that eliminates glare that may reflect from object 1202.

FIG. 13 is a flowchart illustrating a process for object based avatar tracking using object avatar rendering tables in accordance with an illustrative embodiment. The process in FIG.

13 is implemented by software for tracking avatars in a range of an object, such as object based avatar tracking controller 308 in FIG. 3.

The process begins when an avatar comes in range of the object (step 1302). A determination is made as to whether there is an existing session associated with the unique identifier of the object and the unique identifier of the avatar (step 1304). This step may be implemented by making a query to the object avatar rendering table for the object. If there is not an existing session, the process creates a record in the object avatar rendering table with the unique identifier of the object and the unique identifier of the avatar (step 1306). The record in the object avatar rendering table may include other information, such as, without limitation, a date and time, which can be used for analysis, reporting, and billing purposes. The process triggers any object initiation process defined by the object (step 1308). For example, if a user is viewing the object for the first time and the object has a video associated with viewing the object, the process starts playing the video from the beginning.

Returning to step 1304, if a session already exists, the process triggers any object re-initiation process defined by the object (step 1310). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 1312). Changing position may include traveling, turning, or disappearing, such as teleporting, logging off, or disconnecting. If the user's position has not changed, the process returns to step 1312. The process may return to step 1312 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 1312, the process adds the user position data to the object avatar rendering table (step 1314). The user position data includes angle of view coordinate data of the avatar relative to the object and distance of the avatar to the object. The process then makes a determination as to whether to invoke one or more geometric and texture modifications (GTMs) to modify the object based a real world identity of a user controlling the avatar (step 1315). If one or more geometric and texture modifications should be invoked based on the user's real world identity, the process invokes the one or more geometric and texture modification methods (GTMs) (step 1316) to improve visibility of the object. The geometric and texture modifications may include, without limitation, floating the object, moving the object along a fixed path, changing the color of the object, changing the size of the object, and/or cloning the object.

The process then makes a determination as to whether the user is out of view (step 1318). The user may be out of view if the user or the user's avatar has disappeared or is no longer facing the object. If the user is not out of view, after a specified amount of time the process returns to step 1312. The specified amount of time may be configured by the virtual universe grid administrator or object owner. The specified amount of time may be, without limitation, a specified number of seconds or a specified number of milliseconds.

If the user is out of view at step 1318, the process logs a session pause (step 1320). The log may include the date and time. Next, the process makes a determination as to whether the session has been paused for an amount of time that exceeds a threshold amount of time (step 1322). The threshold amount of time may be configured by a virtual universe administrator or object owner. If the pause does not exceed the threshold, the process returns to step 1322. When the pause exceeds the threshold, the process terminates thereafter.

The process termination may include, without limitation, removing the records of the avatar from the object avatar rendering table. If the record is not deleted, when the avatar comes back into range of the object at step 1302, the process will make a determination at step 1304 that an existing session associated with the unique identifier of the object and a unique identifier of the avatar already exist.

Figure 14:
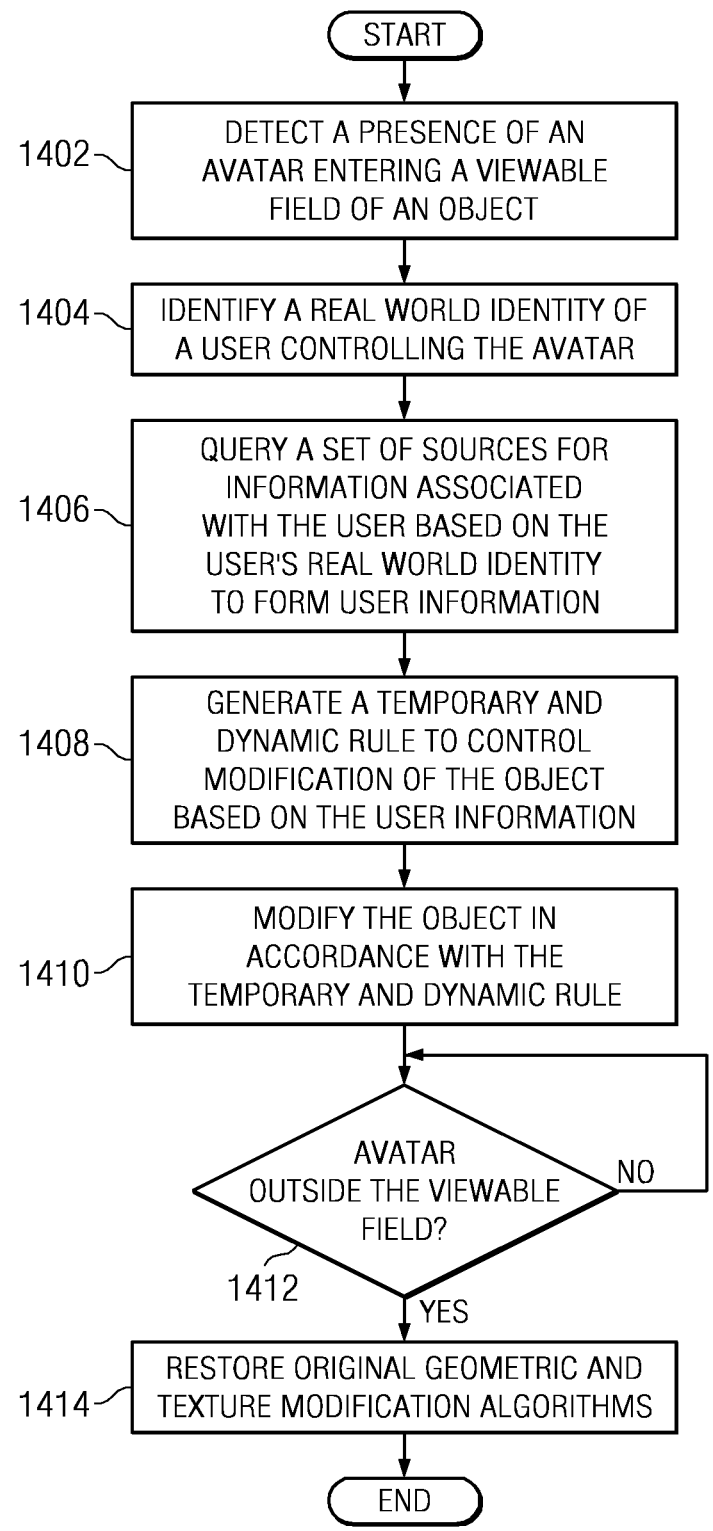
FIG. 14 is a flowchart illustrating a process for modifying an object based on a real world identity of a user controlling an avatar in a virtual universe in accordance with an illustrative embodiment.

FIG. 14 is a flowchart illustrating a process for modifying an object based on a real world identity of a user controlling an avatar in a virtual universe in accordance with an illustrative embodiment. The process in FIG. 14 is implemented by software for modifying objects in a virtual universe based on characteristics of a real world user controlling an avatar in the virtual universe, such as user priority controller 342 in FIG. 3.

The process begins by detecting a presence of an avatar entering a viewable field of an object (step 1402). The process identifies a real world identity of a user controlling the avatar entering the viewable field (step 1404). The process queries a set of sources for information associated with the user based on the user's real world identity to form user information (step 1406). The user information may include the user's profession, credit rating, history of past purchases and transactions, the user's purchasing trends, age, marital status, children, pets, type of cars purchased, type of computer used by the user, residence, income level, criminal record, hobbies, interests, favorite sports, favorite foods or beverages, or any other characteristics of the user.

The process generates a temporary and dynamic rule to control modification of the object based on the user information (step 1408). For example, if the user information indicates that the user has pets and is a recovering alcoholic, the temporary and dynamic rule may control modification of the object to move closer to the user's avatar if the object is advertising pet products but refrain from making any modifications to the object or modify the object so as to be less visible to the user if the object is advertising products associated with alcoholic beverages.

The process modifies the object in accordance with the temporary and dynamic rule (step 1410). The temporary and dynamic rule may specify modifying the object to float the object, move the object along a fixed path, clone the object, or change the object's size, color, or other attributes of the object. The process then makes a determination as to whether the avatar is outside the viewable field (step 1412). When the avatar has moved outside the viewable field, the process restores the original geometric and texture modification algorithms (step 1414) with the process terminating thereafter. Thus, if a geometric and texture modification method is invoked to float the object above a ground level based on the real world identity of the user, when the user's avatar is outside the viewable field of the object, the object is returned to its original position at ground level so that the object is no longer floating.

Figure 15:
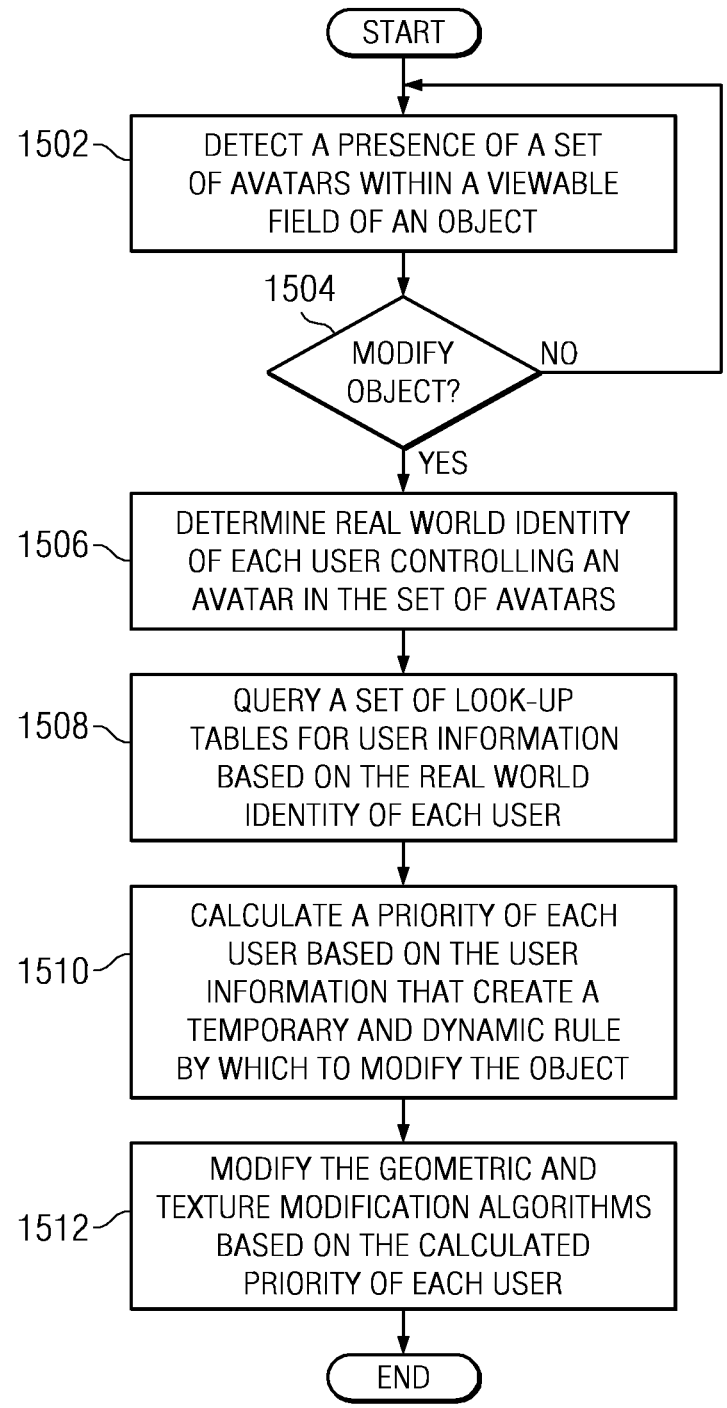
FIG. 15 is a flowchart illustrating a process for determining a priority of each user within a viewable field of an object in accordance with an illustrative embodiment.

FIG. 15 is a flowchart illustrating a process for determining a priority of each user within a viewable field of an object in accordance with an illustrative embodiment. The process in FIG. 15 is implemented by software for modifying objects based on a real world identity of a user, such as user priority controller 342 in FIG. 3.

The process begins by detecting a presence of a set of avatars within a viewable field of an object (step 1502). A set of avatars may be a single avatar or two or more avatars. The process makes a determination as to whether to modify the object (step 1504). If the object is to be modified, the process determines a real world identity of each user controlling an avatar in the set of avatars (step 1506). The process queries a set of look-up tables for user information of each user based on the real world identity of each user (step 1508). The process calculates a priority of each user based on the user information that is used to create a temporary and dynamic rule by which to modify the object (step 1510). For example, if the user information indicates that a first user has a history of purchasing expensive, top quality computer equipment and a second user has a bad credit rating, the first user is given priority over the second user. In this case, the temporary and dynamic rule may modify the object to orient the object toward the location of the first user to increase the first user's ability to see the object without regard to the presence or location of the second user.

The process modifies the geometric and texture modification algorithms based on the calculated priority of each user (step 1512) with the process terminating thereafter.

Figure 16:
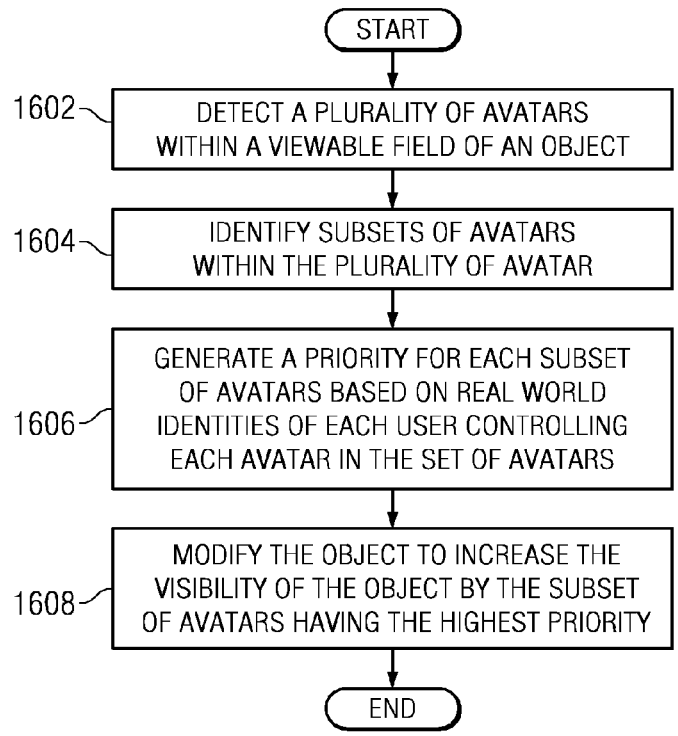
FIG. 16 is a flowchart illustrating a process for modifying an object to increase the visibility of the object by avatars within a viewable field of an object.

FIG. 16 is a flowchart illustrating a process for modifying an object to increase the visibility of the object by avatars within a viewable field of an object. The process in FIG. 16 is implemented by software for modifying objects based on a real world identity of a user, such as user priority controller 342 in FIG. 3.

The process begins by detecting a plurality of avatars within a viewable field of an object (step 1602). The process identifies subsets of avatars within the plurality of avatars (step 1604). The process generates a priority for each subset of avatars based on real world identities of each user controlling each avatar in the set of avatars (step 1606). The subset of avatars may include a single avatar, as well as two or more avatars. The process modifies the object to increase the visibility of the object by the subset of avatars having the highest priority (step 1608) with the process terminating thereafter.

Thus, the illustrative embodiments provide a computer implemented method, apparatus, and computer usable program product for modifying objects in a virtual universe. A user priority controller determines a real world identity of a set of users controlling a set of avatars in response to detecting a presence of the set of avatars within a viewable field of an object in a virtual universe. The user priority controller receives user information describing characteristics of the set of users from a set of user information sources based on the real world identity of each user in the set of users. The user priority controller generates a temporary and dynamic rule to control modification of the object based on the user information. The user priority controller modifies the object in accordance with the temporary and dynamic rule to increase visibility of the object to an avatar in the set of avatars. The temporary and dynamic rule initiates implementation of a set of geometric and texture modifications for dynamically modifying the object in accordance with the temporary and dynamic rule.

The real world user identification controller identifies the real world identity of a user controlling an avatar in a virtual universe and enhances the impact of advertisements by rendering advertisements and other objects within a given range of an avatar based on the identity of the user. The advertisements may be rendered with one or more modifications to the advertisement or other object based on the real world identity of the user controlling the avatar to improve the impact of the advertisements and/or increase the likelihood of a favorable reaction of the real world user to the advertisement rendered in the virtual universe.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing and displaying objects in a computer-simulated virtual universe, the method comprising:
   a computer including in the computer-simulated virtual universe a viewable field, a detection area that is adjacent to the viewable field, and an outside area that is outside the viewable field and the detection area, wherein each avatar in a set of avatars is incapable of viewing the objects while the avatar is within either the detection area or the outside area;
   the computer, in response to an entrance of a first particular avatar of the set of avatars into the detection area, determining whether the first particular avatar has previously viewed a particular one of the objects inside the viewable field;
   the computer, in response to determining that the first particular avatar has not previously viewed the particular one of the objects inside the viewable field, triggering an object initiation process that includes buffering all of a content associated with the particular one of the objects in a buffer to prepare to display, without displaying, to the first particular avatar of the set of avatars the particular one of the objects along with all of the content associated with the particular one of the objects in the buffer;
   the computer, in response to determining that the first particular avatar has previously viewed the particular one of the objects inside the viewable field, triggering an object re-initiation process that includes buffering a portion of the content associated with the particular one of the objects in the buffer to prepare to display, without displaying, to the first particular avatar of the set of avatars the particular one of the objects along with the portion of the content associated with the particular one of the objects in the buffer;
   the computer determining that the particular one of the objects is adjacent to an obstructing one of the objects;
   the computer, in response to determining that the particular one of the objects is adjacent to the obstructing one of the objects, setting a focal point of the viewable field at a location that is a different location than a location of the particular one of the objects; and
   the computer, in response to the first particular avatar entering the viewable field, displaying the particular one of the objects along with one of all of the content associated with the particular one of the objects or the portion of the content associated with the particular one of the objects to the first particular avatar based on the buffering of the content in the buffer according to the object initiation process or the object re-initiation process, respectively.

2. The method of claim 1 further comprising:
   the computer detecting a presence of the set of avatars within the viewable field of the particular one of the objects;
   the computer determining a real world identity of each user in a set of users that controls an avatar in the set of avatars;
   the computer receiving user information that is associated with the real world identity of each user in the set of users;
   the computer assigning, for each avatar in the set of avatars, a priority to the avatar in the set of avatars based on the particular one of the objects and on the user information that is associated with the real world identity of the user in the set of users that controls the avatar in the set of avatars;
   the computer creating a temporary and dynamic rule to control modification of the particular one of the objects based on the priority assigned to each avatar in the set of avatars;
   the computer modifying the particular one of the objects to have a first visibility to a second particular avatar in the set of avatars and to have a second visibility to a third particular avatar in the set of avatars in accordance with the temporary and dynamic rule wherein the first visibility is different from the second visibility; and
   the computer initiating implementation of a set of geometric and texture modifications for dynamically modifying the particular one of the objects in accordance with the temporary and dynamic rule.

3. The method of claim 2, further comprising:
   the computer receiving the user information from a set of user information sources, wherein the set of user information sources includes an external user information look-up table.

4. The method of claim 2 wherein the set of geometric and texture modifications comprises at least one of floating the particular one of the objects above a surface in the computer-simulated virtual universe, moving the particular one of the objects along a fixed path in the computer-simulated virtual universe, changing a size of the particular one of the objects, changing a size of a set of elements associated with the particular one of the objects, changing a color of the particular one of the objects, and cloning the particular one of the objects.

5. The method of claim 2 wherein the user information comprises at least one of past purchasing history, credit rating, purchase trends, income level, hobbies, income, employment history, current employer, profession, education level, children, pets, and home ownership.

6. The method according to claim 2, further comprising:
the computer modifying the particular one of the objects to have the first visibility at a same time the particular one of the objects has the second visibility.

7. The method according to claim 6, further comprising:
the computer modifying the particular one of the objects to have the first visibility and to have the second visibility, wherein the first visibility is an increased visibility and the second visibility is a reduced visibility.

8. The method according to claim 2, further comprising:
the computer using the priority to identify a first particular plurality of avatars of the set of avatars that are assigned a high priority that is higher than a low priority that is assigned to a second particular plurality of avatars of the set of avatars; and
the computer modifying the particular one of the objects to have a third visibility to the first particular plurality of avatars and to have a fourth visibility to the second particular plurality of avatars, wherein the third visibility is increased with respect to the fourth visibility.

9. A computer program product for managing and displaying objects in a computer-simulated virtual universe, the computer program product comprising:
one or more computer-readable tangible storage devices;
program instructions, stored on at least one of the one or more storage devices, to include in the computer-simulated virtual universe a viewable field, a detection area that is adjacent to the viewable field, and an outside area that is outside the viewable field and the detection area, wherein each avatar in a set of avatars is incapable of viewing the objects while the avatar is within either the detection area or the outside area;
program instructions, stored on at least one of the one or more storage devices, to, in response to an entrance of a first particular avatar of the set of avatars into the detection area, determine whether the first particular avatar has previously viewed a particular one of the objects inside the viewable field;
program instructions, stored on at least one of the one or more storage devices, to, in response to determining that the first particular avatar has not previously viewed the particular one of the objects inside the viewable field, trigger an object initiation process that includes buffering all of a content associated with the particular one of the objects in a buffer to prepare to display, without displaying, to the first particular avatar of the set of avatars the particular one of the objects along with all of the content associated with the particular one of the objects in the buffer;
program instructions, stored on at least one of the one or more storage devices, to, in response to determining that the first particular avatar has previously viewed the particular one of the objects inside the viewable field, trigger an object re-initiation process that includes buffering a portion of the content associated with the particular one of the objects in the buffer to prepare to display, without displaying, to the first particular avatar of the set of avatars the particular one of the objects along with the portion of the content associated with the particular one of the objects in the buffer;
program instructions, stored on at least one of the one or more storage devices, to determine that the particular one of the objects is adjacent to an obstructing one of the objects;
program instructions, stored on at least one of the one or more storage devices, to, in response to determining that the particular one of the objects is adjacent to the obstructing one of the objects, set a focal point of the viewable field at a location that is a different location than a location of the particular one of the objects; and
program instructions, stored on at least one of the one or more storage devices, to, in response to the first particular avatar entering the viewable field, display the particular one of the objects along with one of all of the content associated with the particular one of the objects or the portion of the content associated with the particular one of the objects to the first particular avatar based on the buffering of the content in the buffer according to the object initiation process or the object re-initiation process, respectively.

10. The computer program product of claim 9 further comprising:
program instructions, stored on at least one of the one or more storage devices, to detect a presence of the set of avatars within the viewable field of the particular one of the objects;
program instructions, stored on at least one of the one or more storage devices, to determine a real world identity of each user in a set of users that controls an avatar in the set of avatars;
program instructions, stored on at least one of the one or more storage devices, to receive user information that is associated with the real world identity of each user in the set of users;
program instructions, stored on at least one of the one or more storage devices, to, for each avatar in the set of avatars, assign a priority to the avatar in the set of avatars based on the particular one of the objects and on the user information that is associated with the real world identity of the user in the set of users that controls the avatar in the set of avatars;
program instructions, stored on at least one of the one or more storage devices, to create a temporary and dynamic rule to control modification of the particular one of the objects based on the priority assigned to each avatar in the set of avatars;
program instructions, stored on at least one of the one or more storage devices, to modify the particular one of the objects to have a first visibility to a second particular avatar in the set of avatars and to have a second visibility to a third particular avatar in the set of avatars in accordance with the temporary and dynamic rule, wherein the first visibility is different from the second visibility; and
program instructions, stored on at least one of the one or more storage devices, to initiate implementation of a set of geometric and texture modifications for dynamically modifying the particular one of the objects in accordance with the temporary and dynamic rule.

11. The computer program product of claim 10 further comprising:
program instructions, stored on at least one of the one or more storage devices, to receive the user information from a set of user information sources, wherein the set of user information sources includes an external user information look-up table.

12. The computer program product of claim 10 wherein the set of geometric and texture modifications comprises at least one of floating the particular one of the objects above a surface in the computer-simulated virtual universe, moving the particular one of the objects along a fixed path in the computer-simulated virtual universe, changing a size of the particular one of the objects, changing a size of a set of elements associated with the particular one of the objects, changing a color of the particular one of the objects, and cloning the particular one of the objects.

13. The computer program product of claim 10 wherein the user information comprises at least one of past purchasing history, credit rating, purchase trends, income level, hobbies, income, employment history, current employer, profession, education level, children, pets, and home ownership.

14. The computer program product of claim 11 further comprising:
   program instructions, stored on at least one of the one or more storage devices, to send a query to an online user information database that is included in the set of user information sources via a network connection.

15. A computer system for managing and displaying objects in a computer-simulated virtual universe, the computer system comprising:
   one or more processors, one or more computer-readable memories and one or more computer-readable tangible storage devices;
   program instructions, stored on at least one of the one or more storage devices for execution by at least one of the one or more processors via at least one of the one or more memories, to include in the computer-simulated virtual universe a viewable field, a detection area that is adjacent to the viewable field, and an outside area that is outside the viewable field and the detection area, wherein each avatar in a set of avatars is incapable of viewing the objects while the avatar is within either the detection area or the outside area;
   program instructions, stored on at least one of the one or more storage devices for execution by at least one of the one or more processors via at least one of the one or more memories, to, in response to an entrance of a particular avatar of the set of avatars into the detection area, determine whether the first particular avatar has previously viewed a particular one of the objects inside the viewable field;
   program instructions, stored on at least one of the one or more storage devices for execution by at least one of the one or more processors via at least one of the one or more memories, to, in response to determining that the first particular avatar has not previously viewed the particular one of the objects inside the viewable field, trigger an object initiation process that includes buffering all of a content associated with the particular one of the objects in a buffer to prepare to display, without displaying, to the first particular avatar of the set of avatars the particular one of the objects along with all of the content associated with the particular one of the objects in the buffer;
   program instructions, stored on at least one of the one or more storage devices for execution by at least one of the one or more processors via at least one of the one or more memories, to, in response to determining that the first particular avatar has previously viewed the particular one of the objects inside the viewable field, trigger an object re-initiation process that includes buffering a portion of the content associated with the particular one of the objects in the buffer to prepare to display, without displaying, to the first particular avatar of the set of avatars the particular one of the objects along with the portion of the content associated with the particular one of the objects in the buffer;
   program instructions, stored on at least one of the one or more storage devices for execution by at least one of the one or more processors via at least one of the one or more memories, to determine that the particular one of the objects is adjacent to an obstructing one of the objects;
   program instructions, stored on at least one of the one or more storage devices for execution by at least one of the one or more processors via at least one of the one or more memories, to, in responsive determining that the particular one of the objects is adjacent to the obstructing one of the objects, set a focal point of the viewable field at a location that is a different location than a location of the particular one of the objects; and
   program instructions, stored on at least one of the one or more storage devices for execution by at least one of the one or more processors via at least one of the one or more memories, to, in response to the first particular avatar entering the viewable field, display the particular one of the objects along with one of all of the content associated with the particular one of the objects or the portion of the content associated with the particular one of the objects to the first particular avatar based on the buffering of the content in the buffer according to the object initiation process or the object re-initiation process, respectively.

16. The computer system according to claim 15, further comprising:
   program instructions, stored on at least one of the one or more storage devices for execution by at least one of the one or more processors via at least one of the one or more memories, to detect a presence of the set of avatars within the viewable field of the particular one of the objects;
   program instructions, stored on at least one of the one or more storage devices for execution by at least one of the one or more processors via at least one of the one or more memories, to determine a real world identity of each user in a set of users that controls an avatar in the set of avatars;
   program instructions, stored on at least one of the one or more storage devices for execution by at least one of the one or more processors via at least one of the one or more memories, to receive user information that is associated with the real world identity of each user in the set of users;
   program instructions, stored on at least one of the one or more storage devices for execution by at least one of the one or more processors via at least one of the one or more memories, to assign, for each avatar in the set of avatars, a priority to the avatar in the set of avatars based on the particular one of the objects and on the user information that is associated with the real world identity of the user in the set of users that controls the avatar in the set of avatars;
   program instructions, stored on at least one of the one or more storage devices for execution by at least one of the one or more processors via at least one of the one or more memories, to create a temporary and dynamic rule to control modification of the particular one of the objects based on the priority assigned to each avatar in the set of avatars;
   program instructions, stored on at least one of the one or more storage devices for execution by at least one of the one or more processors via at least one of the one or more memories, to modify the particular one of the objects to have a first visibility to a second particular avatar in the set of avatars and to have a second visibility to a third particular avatar in the set of avatars in accordance with the temporary and dynamic rule wherein the first visibility is different from the second visibility; and program instructions, stored on at least one of the one or more storage devices for execution by at least one of the one or more processors via at least one of the one or more memories, to initiate implementation of a set of geometric and texture modifications for dynamically modifying the particular one of the objects in accordance with the temporary and dynamic rule.

17. The computer system according to claim 16, further comprising:
program instructions, stored on at least one of the one or more storage devices for execution by at least one of the one or more processors via at least one of the one or more memories, to receive the user information from a set of user information sources, wherein the set of user information sources includes an external user information look-up table.

18. The computer system according to claim 16 wherein the set of geometric and texture modifications comprises at least one of floating the particular one of the objects above a surface in the computer-simulated virtual universe, moving the particular one of the objects along a fixed path in the computer-simulated virtual universe, changing a size of the particular one of the objects, changing a size of a set of elements associated with the particular one of the objects, changing a color of the particular one of the objects, and cloning the particular one of the objects.

19. The computer system according to claim 16 wherein the user information comprises at least one of past purchasing history, credit rating, purchase trends, income level, hobbies, income, employment history, current employer, profession, education level, children, pets, and home ownership.

20. The computer system according to claim 16, further comprising:
program instructions, stored on at least one of the one or more storage devices for execution by at least one of the one or more processors via at least one of the one or more memories, to modify the particular one of the objects to have the first visibility at a same time the particular one of the objects has the second visibility.

21. The computer system according to claim 20, further comprising:
program instructions, stored on at least one of the one or more storage devices for execution by at least one of the one or more processors via at least one of the one or more memories, to modify the particular one of the objects to have the first visibility and to have the second visibility, wherein the first visibility is an increased visibility and the second visibility is a reduced visibility.

22. The computer system according to claim 16, further comprising:
program instructions, stored on at least one of the one or more storage devices for execution by at least one of the one or more processors via at least one of the one or more memories, to use the priority to identify a first particular plurality of avatars of the set of avatars that are assigned a high priority that is higher than a low priority that is assigned to a second particular plurality of avatars of the set of avatars; and
program instructions, stored on at least one of the one or more storage devices for execution by at least one of the one or more processors via at least one of the one or more memories, to modify the particular one of the objects to have a third visibility to the first particular plurality of avatars and to have a fourth visibility to the second particular plurality of avatars, wherein the third visibility is increased with respect to the fourth visibility.

* * * * *